US009755995B2

(12) United States Patent
Underwood, IV et al.

(10) Patent No.: US 9,755,995 B2
(45) Date of Patent: Sep. 5, 2017

(54) SYSTEM AND METHOD FOR APPLYING GESTURE INPUT TO DIGITAL CONTENT

(71) Applicant: Dropbox, Inc., San Francisco, CA (US)

(72) Inventors: George Milton Underwood, IV, Palo Alto, CA (US); Elizabeth Armistead, San Francisco, CA (US); Sean Beausoleil, Mountain View, CA (US); Scott Cannon, Mountain View, CA (US); Adam Cue, San Francisco, CA (US); Darian Edwards, Burnsville, MN (US); Steven Flory, Los Altos, CA (US); Elanor Luna, San Francisco, CA (US)

(73) Assignee: DROPBOX, INC., San Francisco, CA (US)

( * ) Notice: Subject to any disclaimer, the term of this patent is extended or adjusted under 35 U.S.C. 154(b) by 381 days.

(21) Appl. No.: 14/056,850

(22) Filed: Oct. 17, 2013

(65) Prior Publication Data
US 2014/0143738 A1    May 22, 2014

Related U.S. Application Data

(60) Provisional application No. 61/728,626, filed on Nov. 20, 2012.

(51) Int. Cl.
*G06F 3/048* (2013.01)
*H04L 12/58* (2006.01)
(Continued)

(52) U.S. Cl.
CPC .............. *H04L 51/00* (2013.01); *G06F 3/017* (2013.01); *G06F 3/0482* (2013.01);
(Continued)

(58) Field of Classification Search
None
See application file for complete search history.

(56) References Cited

U.S. PATENT DOCUMENTS

| 5,754,178 A | 5/1998 | Johnston et al. |
| 5,822,526 A | 10/1998 | Waskiewicz |

(Continued)

FOREIGN PATENT DOCUMENTS

| AU | 2011253700 A1 | 12/2011 |
| CN | 102495692 A | 6/2012 |

(Continued)

OTHER PUBLICATIONS

"[Quick Tip] Hold Mouse Right Button for More Options on Drag and Drop," Guiding Tech, Jul. 1, 2012, [online], <URL: http://www.guidingtech.com/12504/hold-mouse-right-button-more-drag-drop-options/>, 6 pages.

(Continued)

*Primary Examiner* — Thanh Vu
(74) *Attorney, Agent, or Firm* — Stephanie Wang; Page Ponsford; DLA Piper LLP US

(57) ABSTRACT

A system and method for managing messages within an application interface that includes receiving a message stream; providing a navigational menu to a set of message streams; detecting an initiated gesture item for at least one message within a view of the navigational menu; tracking gesture-state within a progressive order of gesture-states; identifying an action of the gesture-state wherein the action corresponds to the current view and relative ordering of the navigational menu; and applying the message sorting action on the message according to a final gesture-state.

18 Claims, 23 Drawing Sheets

(51) Int. Cl.
*G06F 3/01* (2006.01)
*G06F 3/0482* (2013.01)
*G06F 3/0488* (2013.01)

(52) U.S. Cl.
CPC ...... *G06F 3/04883* (2013.01); *G06F 3/04886* (2013.01); *H04L 51/38* (2013.01)

(56) References Cited

U.S. PATENT DOCUMENTS

| | | |
|---|---|---|
| 6,411,684 B1 | 6/2002 | Cohn et al. |
| 6,545,669 B1 | 4/2003 | Kinawi et al. |
| 6,941,348 B2 | 9/2005 | Petry |
| 7,363,345 B2 | 4/2008 | Austin-Lane et al. |
| 7,505,571 B2 | 3/2009 | Bhatia et al. |
| 7,525,691 B2 | 4/2009 | Gordon |
| 7,788,218 B2 | 8/2010 | Gerritsen et al. |
| 7,886,236 B2 | 2/2011 | Kolmykov-Zotov |
| 7,895,537 B2 | 2/2011 | Gruen |
| 8,019,863 B2 | 9/2011 | Jeide et al. |
| 8,250,159 B2 | 8/2012 | Starbuck et al. |
| 8,255,468 B2 | 8/2012 | Vitaldevara et al. |
| 8,291,349 B1 | 10/2012 | Park |
| 8,316,095 B1 | 11/2012 | Wheeler, Jr. |
| 8,390,577 B2 | 3/2013 | LeMort |
| 8,451,246 B1 | 5/2013 | Scholler |
| 8,635,561 B1 | 1/2014 | Bullock |
| 8,775,520 B1 | 7/2014 | Lewis |
| 8,782,566 B2* | 7/2014 | Sarkar ............... 715/728 |
| 8,787,335 B2 | 7/2014 | Smith et al. |
| 8,793,591 B1 | 7/2014 | Coleman |
| 8,839,147 B2 | 9/2014 | Kang |
| 8,910,068 B2 | 12/2014 | Shin |
| 9,063,989 B2 | 6/2015 | Buchheit |
| 9,248,376 B2 | 2/2016 | Yoshikawa |
| 9,360,998 B2 | 6/2016 | Bauder |
| 2002/0054117 A1 | 5/2002 | van Dantzich |
| 2003/0020687 A1 | 1/2003 | Sowden |
| 2005/0015432 A1 | 1/2005 | Cohen |
| 2005/0043015 A1 | 2/2005 | Muramatsu |
| 2005/0081059 A1 | 4/2005 | Bandini et al. |
| 2005/0181768 A1 | 8/2005 | Roy |
| 2005/0275638 A1* | 12/2005 | Kolmykov-Zotov G06F 3/04883 345/179 |
| 2006/0090137 A1 | 4/2006 | Cheng |
| 2006/0155810 A1 | 7/2006 | Butcher |
| 2006/0190830 A1 | 8/2006 | Gerstl |
| 2007/0038707 A1 | 2/2007 | Broder |
| 2007/0076857 A1 | 4/2007 | Chava |
| 2007/0229465 A1 | 10/2007 | Sakai et al. |
| 2007/0277125 A1 | 11/2007 | Shin |
| 2008/0059590 A1 | 3/2008 | Sarafijanovic et al. |
| 2008/0074399 A1 | 3/2008 | Lee |
| 2008/0165145 A1 | 7/2008 | Herz |
| 2008/0201668 A1 | 8/2008 | Roy |
| 2008/0208980 A1 | 8/2008 | Champan et al. |
| 2008/0220798 A1 | 9/2008 | Potluri |
| 2008/0222540 A1 | 9/2008 | Schultz et al. |
| 2008/0256179 A1 | 10/2008 | Gorty |
| 2008/0270548 A1 | 10/2008 | Glickstein |
| 2009/0079699 A1 | 3/2009 | Sun |
| 2009/0093277 A1 | 4/2009 | Lee |
| 2009/0157831 A1 | 6/2009 | Tian et al. |
| 2009/0178008 A1 | 7/2009 | Herz et al. |
| 2009/0244015 A1 | 10/2009 | Sengupta |
| 2009/0254624 A1 | 10/2009 | Baudin et al. |
| 2009/0276701 A1 | 11/2009 | Nurmi |
| 2009/0278806 A1 | 11/2009 | Duarte |
| 2009/0282360 A1 | 11/2009 | Park et al. |
| 2009/0307623 A1 | 12/2009 | Agarawala |
| 2009/0313567 A1 | 12/2009 | Kwon et al. |
| 2010/0031202 A1 | 2/2010 | Morris |
| 2010/0070594 A1 | 3/2010 | Yoshimura |
| 2010/0153493 A1 | 6/2010 | Clarke |
| 2010/0199226 A1 | 8/2010 | Nurmi |
| 2010/0214237 A1 | 8/2010 | Echeverri et al. |
| 2010/0235794 A1* | 9/2010 | Ording ............... G06F 3/0485 715/863 |
| 2010/0241973 A1 | 9/2010 | Whiddett |
| 2010/0257241 A1 | 10/2010 | Hale |
| 2010/0295805 A1 | 11/2010 | Shin |
| 2010/0299638 A1* | 11/2010 | Choi ............... G06F 3/04883 715/835 |
| 2011/0074828 A1 | 3/2011 | Capela |
| 2011/0081923 A1 | 4/2011 | Forutanpour |
| 2011/0163970 A1 | 7/2011 | Lemay |
| 2011/0197153 A1* | 8/2011 | King ............... G06F 3/04883 715/769 |
| 2011/0202616 A1 | 8/2011 | Kinoshita |
| 2011/0289162 A1 | 11/2011 | Furlong |
| 2011/0295958 A1 | 12/2011 | Liu et al. |
| 2011/0296351 A1 | 12/2011 | Ewing, Jr. |
| 2011/0302515 A1 | 12/2011 | Kim |
| 2012/0023375 A1 | 1/2012 | Dutta et al. |
| 2012/0124147 A1 | 5/2012 | Hamlin |
| 2012/0131458 A1 | 5/2012 | Hayes |
| 2012/0131474 A1 | 5/2012 | Panchadsaram |
| 2012/0131659 A1 | 5/2012 | Roy et al. |
| 2012/0185781 A1 | 7/2012 | Guzman |
| 2012/0185797 A1 | 7/2012 | Thorsen |
| 2012/0210214 A1 | 8/2012 | Yoo et al. |
| 2012/0210334 A1 | 8/2012 | Sutedja |
| 2012/0240054 A1 | 9/2012 | Webber |
| 2012/0254793 A1 | 10/2012 | Briand |
| 2012/0256863 A1 | 10/2012 | Zhang |
| 2012/0290946 A1* | 11/2012 | Schrock ............... G06Q 10/107 715/752 |
| 2012/0304074 A1 | 11/2012 | Ooi et al. |
| 2013/0035123 A1 | 2/2013 | Smith et al. |
| 2013/0050118 A1 | 2/2013 | Kjelsbak |
| 2013/0057902 A1 | 3/2013 | Henry |
| 2013/0067392 A1 | 3/2013 | Leonard |
| 2013/0072263 A1 | 3/2013 | Kim |
| 2013/0100036 A1* | 4/2013 | Papakipos ............. G06F 1/1643 345/173 |
| 2013/0104089 A1 | 4/2013 | Rieffel |
| 2013/0125063 A1 | 5/2013 | Lee |
| 2013/0145303 A1* | 6/2013 | Prakash ............... G06F 3/04883 715/779 |
| 2013/0167082 A1 | 6/2013 | Joo et al. |
| 2013/0179801 A1 | 7/2013 | Audet |
| 2013/0204946 A1 | 8/2013 | Forstall |
| 2013/0290876 A1 | 10/2013 | Anderson |
| 2013/0290879 A1 | 10/2013 | Greisson |
| 2013/0324222 A1 | 12/2013 | De Viveiros |
| 2014/0123043 A1 | 5/2014 | Schmidt et al. |
| 2014/0129942 A1 | 5/2014 | Rathod |
| 2014/0143358 A1 | 5/2014 | Beausoleil et al. |
| 2014/0143683 A1 | 5/2014 | Underwood, IV |
| 2014/0157182 A1 | 6/2014 | Kim |
| 2014/0165012 A1 | 6/2014 | Shen |
| 2014/0223347 A1* | 8/2014 | Seo ............... G06F 17/30 715/769 |
| 2014/0304615 A1 | 10/2014 | Coe |
| 2014/0317545 A1 | 10/2014 | Miyazaki |
| 2015/0032829 A1 | 1/2015 | Barshow |
| 2015/0112749 A1 | 4/2015 | Erdal |
| 2015/0135337 A1 | 5/2015 | Fushman |
| 2015/0169068 A1 | 6/2015 | Plagemann |
| 2015/0277717 A1 | 10/2015 | Barabash |
| 2016/0274747 A1 | 9/2016 | Bauder |

FOREIGN PATENT DOCUMENTS

| | | |
|---|---|---|
| EP | 1942401 A1 | 7/2008 |
| EP | 2116927 A2 | 11/2009 |
| EP | 2362592 | 8/2011 |
| JP | 2009151638 | 7/2009 |
| JP | 2010525740 | 7/2010 |
| JP | 2011188327 | 9/2011 |
| JP | 2012038292 | 2/2012 |
| WO | 0163875 | 8/2001 |

(56) References Cited

FOREIGN PATENT DOCUMENTS

| WO | 2008/030970 A2 | 3/2008 |
|---|---|---|
| WO | 2012/068407 A2 | 5/2012 |
| WO | 2013009092 A3 | 1/2013 |

OTHER PUBLICATIONS

Office Action mailed Jun. 19, 2014 in U.S. Appl. No. 14/248,272, 20 pages.
Office Action mailed Jul. 8, 2014 in U.S. Appl. No. 14/056,838, 18 pages.
Office Action mailed May 8, 2015 in U.S. Appl. No. 14/056,838, 15 pages.
International Search Report and Written Opinion mailed Aug. 13, 2014 in PCT/US2013/071074, 15 pages.
Invitation to Pay Fees and Partial International Search Report mailed Feb. 17, 2014 in PCT/US2013/071074, 7 pages.
"Taskbox—Mail," 2013, [online], [retrieved on May 13, 2013], retrieved from the internet <URL: https://itunes.apple.com/us/app/taskbox-mail>, 3 pages.
Klinker, Jacob, "Sliding Messaging Pro," 2013, [online], [retrieved on May 13, 2013], retrieved from the internet <URL: https://play.google.com/store/apps/details?id=com.klinker.android>, 3 pages.
"Triage: Email First Aid," 2013, [online], [retrieved on May 13, 2013], retrieved from the internet <URL: https://www.tiriage.cc/>, 2 pages.
"Orchestra To-do," 2013, [online], [retrieved on May 13, 2013], retrieved from the internet <URL: https://itunes.apple.com/us/app/orchestra-to-do>, 3 pages.
"Activator: a free and extremely powerful jailbreak app launcher for iPhone," posted Feb. 1, 2010 by Thomas Wong, iSource.com, [online], [retrieved on May 13, 2013], retrieved from the internet <URL: http://isource.com/2010/02/01/activator-a-free-and-extremely-powerful>, 5 pages.
"Browse through your email more efficiently with Swipe for Mail," posted Feb. 19, 2012 by Cody Lee, [online], [retrieved on May 13, 2013], retrieved from the internet <URL: http://www.idownloadblog.com/2012/02/19/swipemail-jailbreak-tweak/>, 5 pages.
"Taskbox: Emails & Task Lists Rolled Into One," posted Apr. 22, 2013 by Jesse Virgil, [online], [retrieved on Jan. 3, 2014], retrieved from the internet <URL: http://iphone.appstorm.net/reviews/productivity/taskbox-emails-task-lists-rolled-into-one/>, 12 pages.
"Move Over Mailbox, Taskbox Is Better for Us Working Folks," Mar. 9, 2013, Niblitz.com, [online], [retrieved on Jan. 3, 2014], retrieved from the internet <URL: http://nibletz.com/2013/03/09/move-mailbox-taskbox-working-folks>, 2 pages.
Office Action mailed Jul. 24, 2015 in U.S. Appl. No. 14/077,160, 23 pages.
Tsai, Henry, "Getting Started on Astrid's "Remind Me" Gmail Integration," Astrid.com, [online], Feb. 11, 2013, [retrieved on Jan. 3, 2013], retrieved from the internet: <URL: http://biog.astrid.comNog/2013/02111/getting-started-onastrids-remind-me-extension>, 5 pages.

\* cited by examiner

US 9,755,995 B2

SYSTEM AND METHOD FOR APPLYING GESTURE INPUT TO DIGITAL CONTENT

CROSS-REFERENCE TO RELATED APPLICATIONS

This application claims the benefit of U.S. Provisional Application Ser. No. 61/728,626, filed on 20 Nov. 2012, which is incorporated in its entirety by this reference.

TECHNICAL FIELD

This invention relates generally to the user interface field, and more specifically to a new and useful system and method for applying gesture input to digital content in the user interface field.

BACKGROUND

Touch devices and wearable computers are becoming increasingly more prevalent as devices used for computing. A challenge with such devices is that while consuming content on such devices is convenient, the input mechanics and the limited screen real estate limit the way in which the devices can be used for actively working on content and manipulating content. Many organizational tools and interfaces that are available on desktop devices do not translate to interfaces to handheld or tablet mobile computing devices. Thus, there is a need in the user interface field to create a new and useful system and method for applying gesture input to digital content. This invention provides such a new and useful system and method.

SUMMARY

The system and method for applying gesture input to digital content of a preferred embodiment functions to enable gesture-based management of digital content. In the system and method, actions can be selectively applied to a digital content item based on tracked gesture input. A single gesture input can progressively transition between different gesture-states with each gesture-state having a mapped action. Graphical rendering of the mapped action provides user feedback of the currently selected action as the gesture input transitions between gesture-states. A benefit of the system and method is a single touch event can explore different action possibilities and selectively invoke a desired action on a digital content item. The system and method can have particular application to enabling actions to be applied to a digital content item that exists within a scrollable or navigable collection of other digital content items. The method can have particular benefits when applied to enabling powerful and natural content sorting capabilities on a device with limited screen real-estate such as on a mobile device, a wearable computer, a tablet computing device, or any suitable computing device. The method is primarily used for sorting between different digital content collections, but can additionally be applied to other forms of digital content.

DESCRIPTION OF THE PREFERRED EMBODIMENTS

The following description of preferred embodiments of the invention is not intended to limit the invention to these preferred embodiments, but rather to enable any person skilled in the art to make and use this invention.

1. System for Organizing Messages

Figure 1:
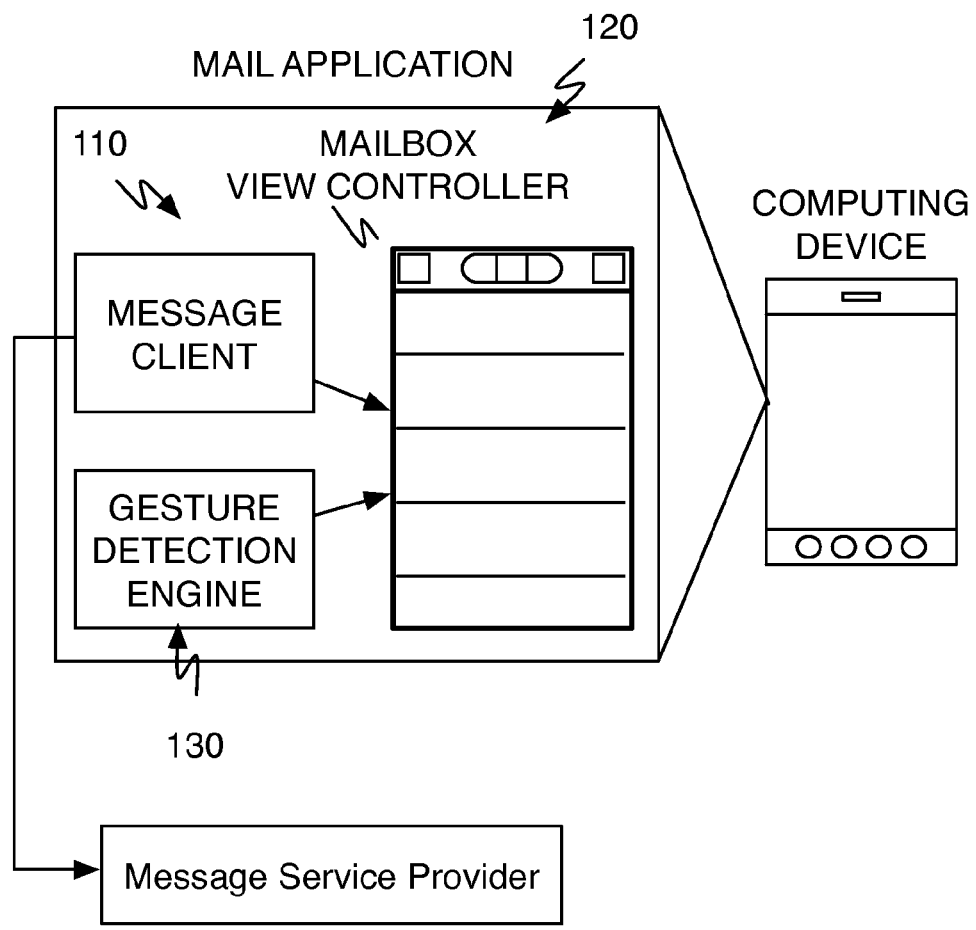
FIG. 1 is a schematic representation of a system of a preferred embodiment of the invention.

As shown in FIG. 1, a system for organizing messages of a preferred embodiment may include a computing device with a display and an application including a message client 110, a mailbox view controller 120, and a gesture detection engine 130. The system functions to render an interactive interface for sorting and managing messages of a mailbox. The system can enable users to quickly and intuitively manage email through a gestural interface. The system can provide a mailbox organization configuration that is managed through gestures applied directly to messages. The system can be configured for interfacing with an email account, but may alternatively or additionally be used with alternative information streams such as social network messaging, news streams, task lists, or any suitable updated collection of information.

The computing device and display of a preferred embodiment functions to process and render the interface for a user. The computing device can be a mobile device such as a smart phone, but may alternatively be a tablet, a desktop computer, a gaming system, a TV-connected computing device, a wearable computing device, or any suitable computing device. The device can includes an input device capable of detecting gestural input. Preferably, the input device is a touch screen, but may alternatively be a user motion/image detection system, device motion sensors, a cursor-positioning device (e.g., a mouse or trackpad), or any suitable input device.

The message client 110 of a preferred embodiment functions to manage the sending, receiving, and manipulation of messages. The message client 110 is preferably a native application operable on the computing device. The message client 110 may alternatively be a web-based application, an operating system based service, a notification service, a framework operable within a second application, or any suitable computer-readable medium storing computer-readable instructions that defines user interactions. The message client 110 preferably communicates with a server of a message service provider, server of a mailbox service that is a proxy for the message service provider, or any suitable messaging service. The message client 110 preferably manages an email account. The message client 110 may alternatively manage social network messaging, instant messaging, information streams or any suitable source of messages. The message client 110 preferably receives messages and appropriately incorporates those messages into a rendered interface. The message client 110 may additionally send messages. Additionally, the message client 110 preferably translates inputs detected by the gesture detection engine into corresponding response actions translated for the message service provider. For example, moving an email to a list may involve creating a folder and adding the message to the folder on the message service provider. Moving a message to trash may queue the message for deletion on the message system provider.

Figure 2:
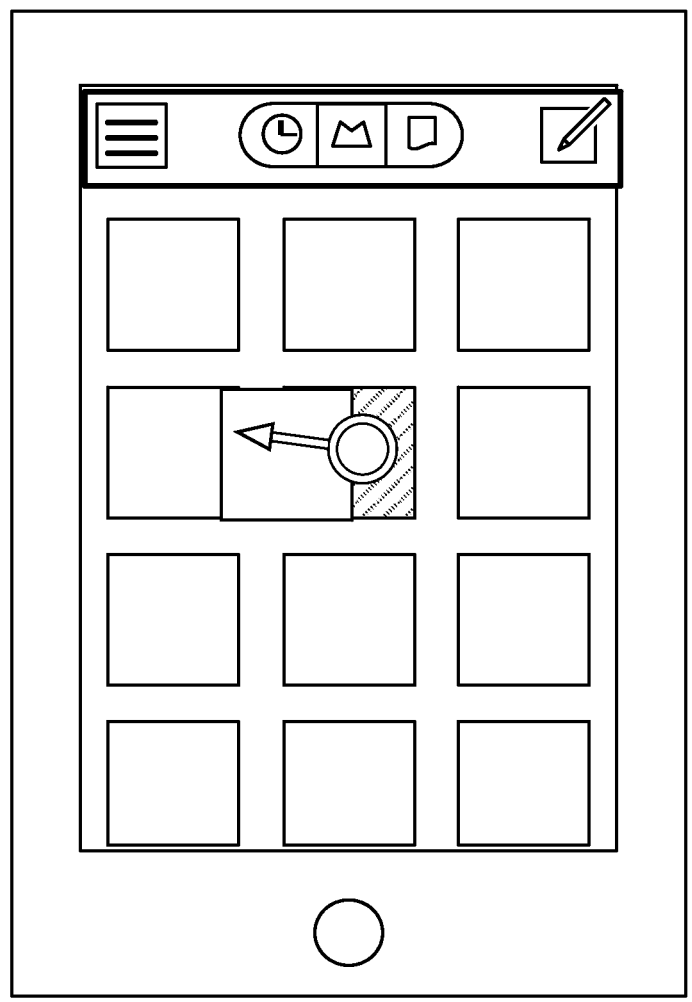
FIG. 2 is a schematic representation of a mailbox view controller presenting message items in a gallery.
Figure 3:
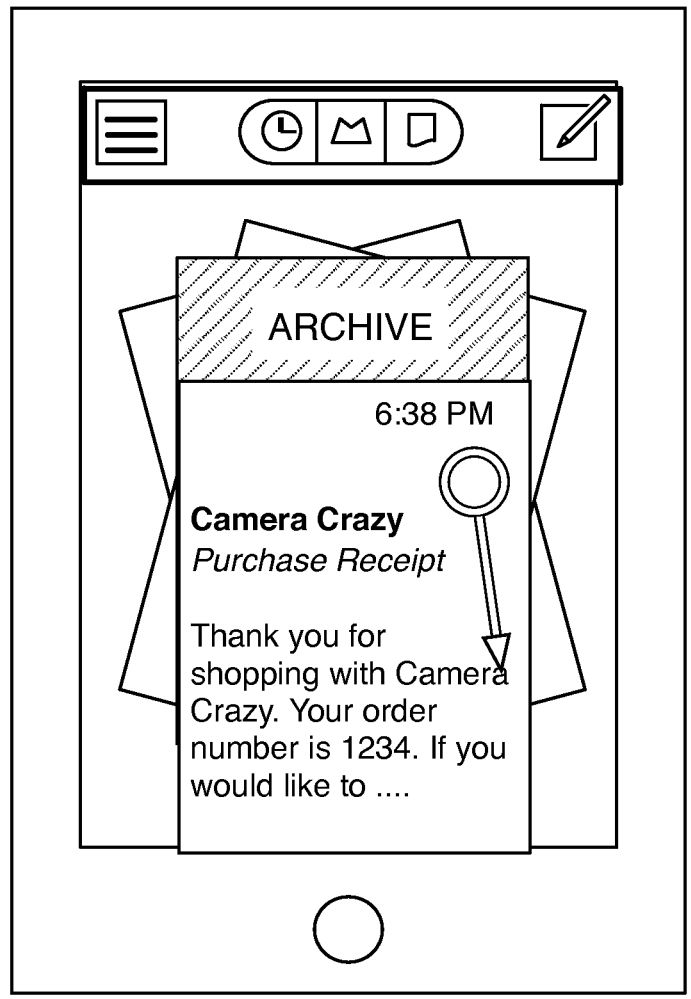
FIG. 3 is a schematic representation of a mailbox view controller presenting message items in a stacked view.

The mailbox view controller 120 of the application of a preferred embodiment functions to render the interface on the display of the device. The mailbox view controller 120 preferably depicts messages as a list of message items. The message items, which are actionable through a gesture input, may alternatively be in presented or rendered in a gallery view as shown in FIG. 2, a stacked view as shown in FIG. 3, a coverflow view, a card view, within a document/article view, or any suitable view of mailbox item or items. The mailbox view controller 120 additionally cooperatively works with the gesture detection engine 130 to render input feedback while the gesture is in progress. For example, as a user slides a touch contact point horizontally across a message, the action of the current gesture-state is displayed according to the planned execution. Additionally, the message is preferably animated as a function of the gesture input. The animation is preferably a horizontal sliding animation that is proportional to the gesture input displacement. Here horizontal is meant to indicate a first axis. The first axis is preferably perpendicular or otherwise distinguishable from a scrolling axis. For example, if the gestures are substantially horizontal then the view is preferably scrollable (if scrolling is enabled) along a vertical axis.

Figure 4:
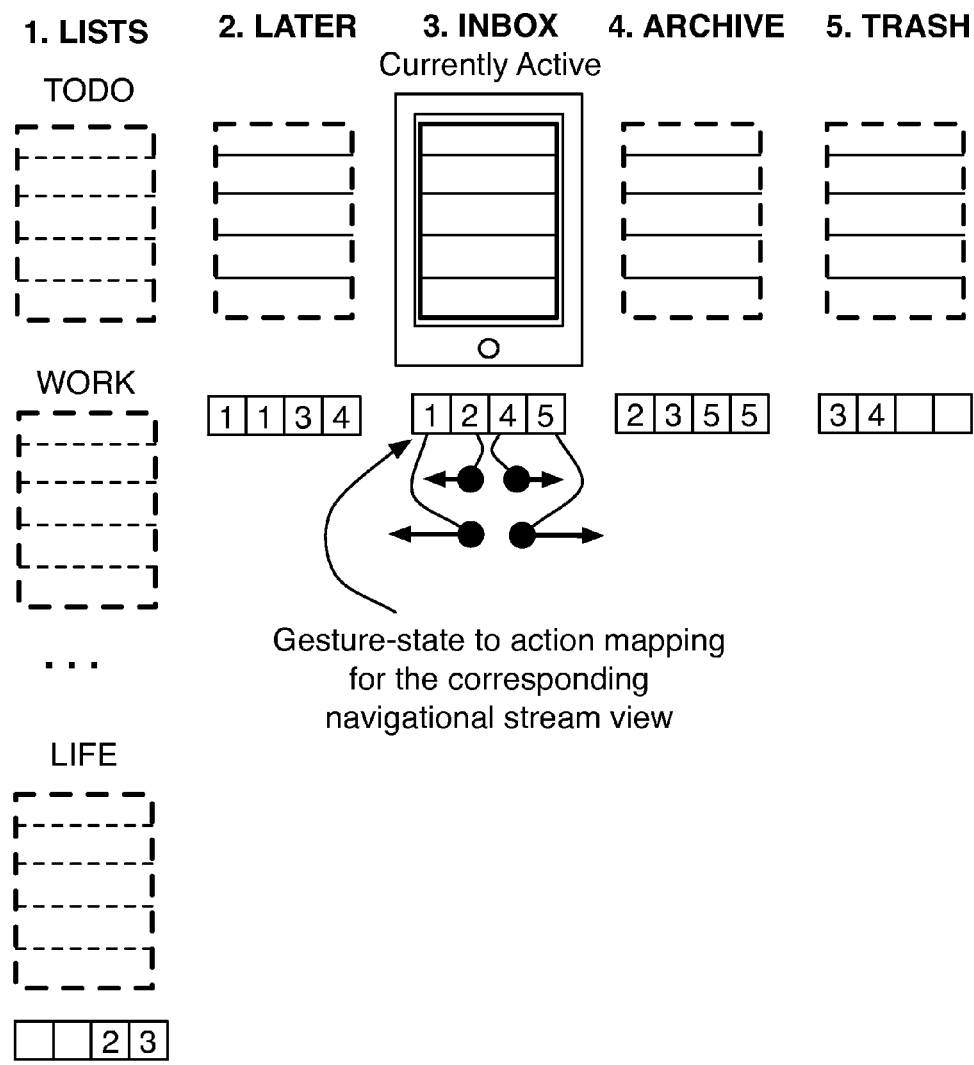
FIG. 4 is a schematic representation of the navigational views and a corresponding gesture-state to action mapping in each view.

The mailbox view controller 120 may additionally be configured to display full messages, lists/folders/streams of an account, and/or any suitable portion of the application interface. In one preferred variation, the navigation of directories (e.g., folders or lists) of a mail account is accessed through interface interaction that promotes a consistent cognitive mapping of directory location and the sorting behavior of gesture-actions. A navigational interface preferably includes an ordered set of views that the message client 110 controls to provide a consistent simulated graphical order/arrangement. A navigational view can be a pane, a modal view, an application-operating mode, or any suitable visual state that contains interface elements. The positional arrangement is preferably aligned along a horizontal axis, and more preferably the views are substantially modular wherein only a limited number of views are active at one time (e.g., one modular view on a phone, two side by side possibly on a tablet). As shown in FIG. 4, the views of the navigational interface may include optional list stream view in a first position, a deferred message stream view in a second position, an inbox in a third/central view, and an archive stream view in a fourth view. As mentioned above the actions corresponding to a gesture preferably map to the current navigational view order, and changing navigational views re-indexing what actions are mapped to a gesture-state. In effect, navigating between views can impact which actions a user can "reach", because the gesture functions to simulate sorting messages to various categorizes that are either one or optionally two navigational positions away in navigable directions (e.g., right or left). In one variation, the consistent indexing is preferably maintained within the central view (e.g., the inbox), and the adjacent navigational views. In some cases, the model may break down because access to critical actions is lost by adhering directly to the corresponding navigational-based mapping. For example, when viewing a list stream view, the mapping may include actions to add to the inbox, setting a reminder condition, and archiving. The mailbox view controller may alternatively be divided into any suitable assortment of components.

The mailbox view controller 120 can additionally make use of graphical animation of navigation views and/or message items to reinforce cognitive cues and feedback relating to gesture-to-action mapping. For example, the gesture-states preferably depend on swiping touch events along an axis. When detecting an in progress gesture, the message mailbox view controller 120 is preferably configured to animate the message item while revealing a UI element that communicates the current action. When the swiping touch event is completed, the message item preferably animates off the screen in the direction of the view that corresponds to the action.

The gesture detection engine 130 of a preferred embodiment functions to analyze and convert user input to actions by the message client. The gesture detection engine 130 preferably executes any number of heuristics to identify different classes of input gestures. There is preferably a plurality of defined gestures that correspond to various message actions. Preferably, the gesture detection engine 130 is coupled to the touch events of a touch screen device. More preferably, the detected gestures are orthogonal to scrolling or content navigation touch gesture detection (e.g., provided by a user interface scroll view). In other words, the gesture detection engine 130 detects various gesture-states that do not conflict with other gesture functionality. An additional benefit of the described gesture detection configuration is that the interface does not require constant presentation of interaction elements, and thus increases screen area for content. The gesture detection engine 130 can preferably achieve this benefit while maintaining an intuitive and discoverable user input interface. The gesture detection engine 130 of a touch device preferably processes the touch start position, the direction of touch motion, velocity of touch motion, acceleration of touch motion, the distance of touch motion, time-progression of touch motion, pressure of touch input, number of touch inputs, relationship of multiple touch inputs, off-screen edge touch event (swiping onto the screen or off the screen), and/or any suitable parameter of the touch input. The gesture-detection engine 130 preferably continuously updates the determined gesture state during received input to reflect the current gesture state, the corresponding action of the gesture-state, and any suitable rendering updates to the user interface to reflect the current state. Touch based devices preferably involve the touch input to be directly applied to displayed user interfaces. For example, the user touches the message item displayed on the screen. Alternatively, the touch events may not be directly applied. For example, on a wearable computing device, the touch sensing may be on a different physical component (e.g., an arm of glasses) where the user interface displayed in a heads up display. In another embodiment, the gesture detection engine 130 processes natural user motion detected by a vision system. Motions of a hand may have similar gesture patterns as touch gesture patterns, but additional or alternative gestures may be used. Similarly, device motion sensors such as accelerometers and gyroscopic sensors of a mobile device may be used to convert movement of a device to an action. As yet another variation, desktop computers can preferably use cursor input devices such as a mouse or trackpad to receive inputs, and those gestures may then be translated to actions. The gestures are preferably configured for the form of input device.

2. Method for Organizing Messages

Figure 5:
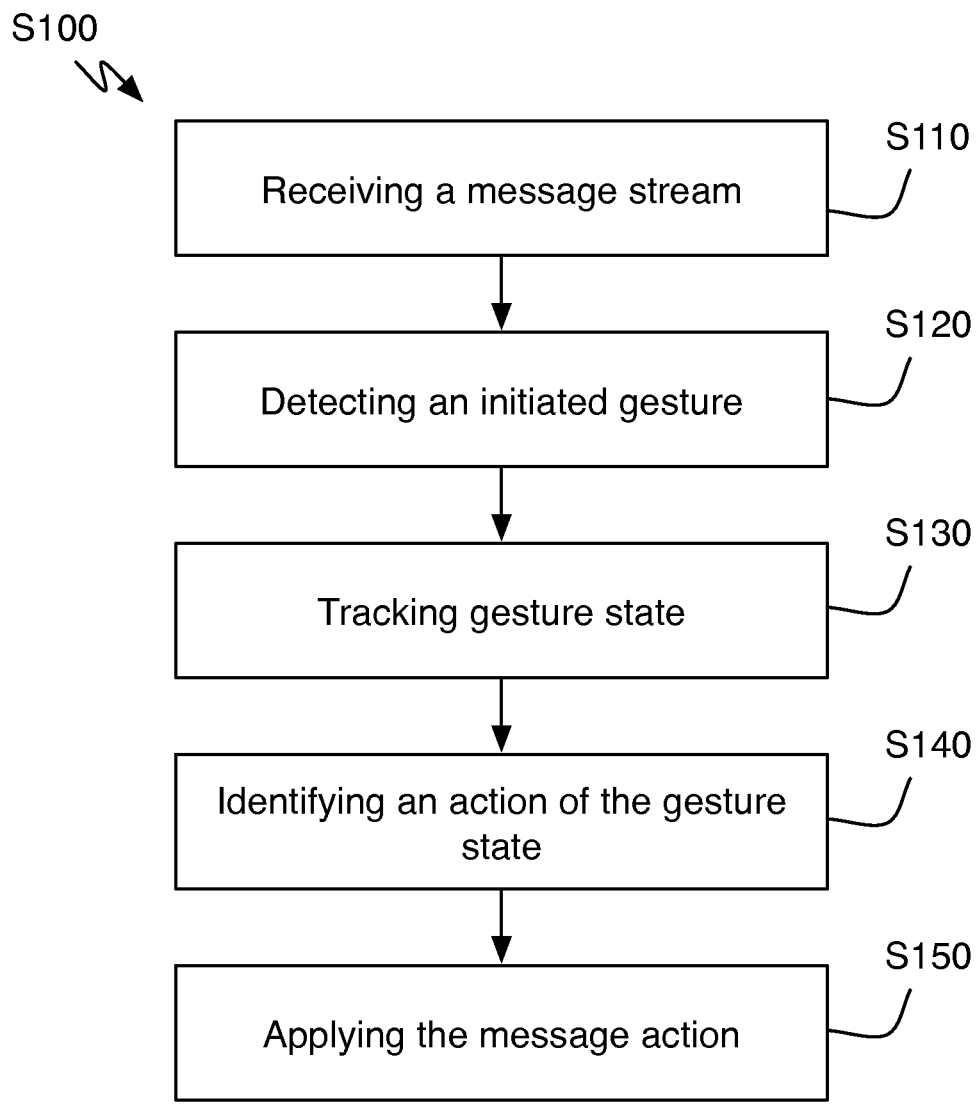
FIG. 5 is a flowchart representation of a method of a preferred embodiment of the invention.

As shown in FIG. 5, a method S100 for organizing messages of a preferred embodiment may include receiving a message stream S110, detecting an initiated gesture for at least one message S120, tracking gesture-state S130, identifying action of gesture-state S140, and applying a message action on the message according to a final gesture-state S150. The method functions to enable gesture-based management of a messaging system. Incoming messages can quickly grow out of control, and thus, the method allows a user to easily sort and apply automatic actions on the messages to simplify management of the messages. The method is preferably used for management of an email account, but may alternatively be used with any suitable messaging system, event, or content stream. The method preferably relies upon a collection of gestures that are mapped to a message action. The gestures and message actions are not limited to those described in this document and may include any suitable gesture-to-action mapping of the gestures and message actions shown and/or described in this document and any suitable alternatives.

Figure 6:
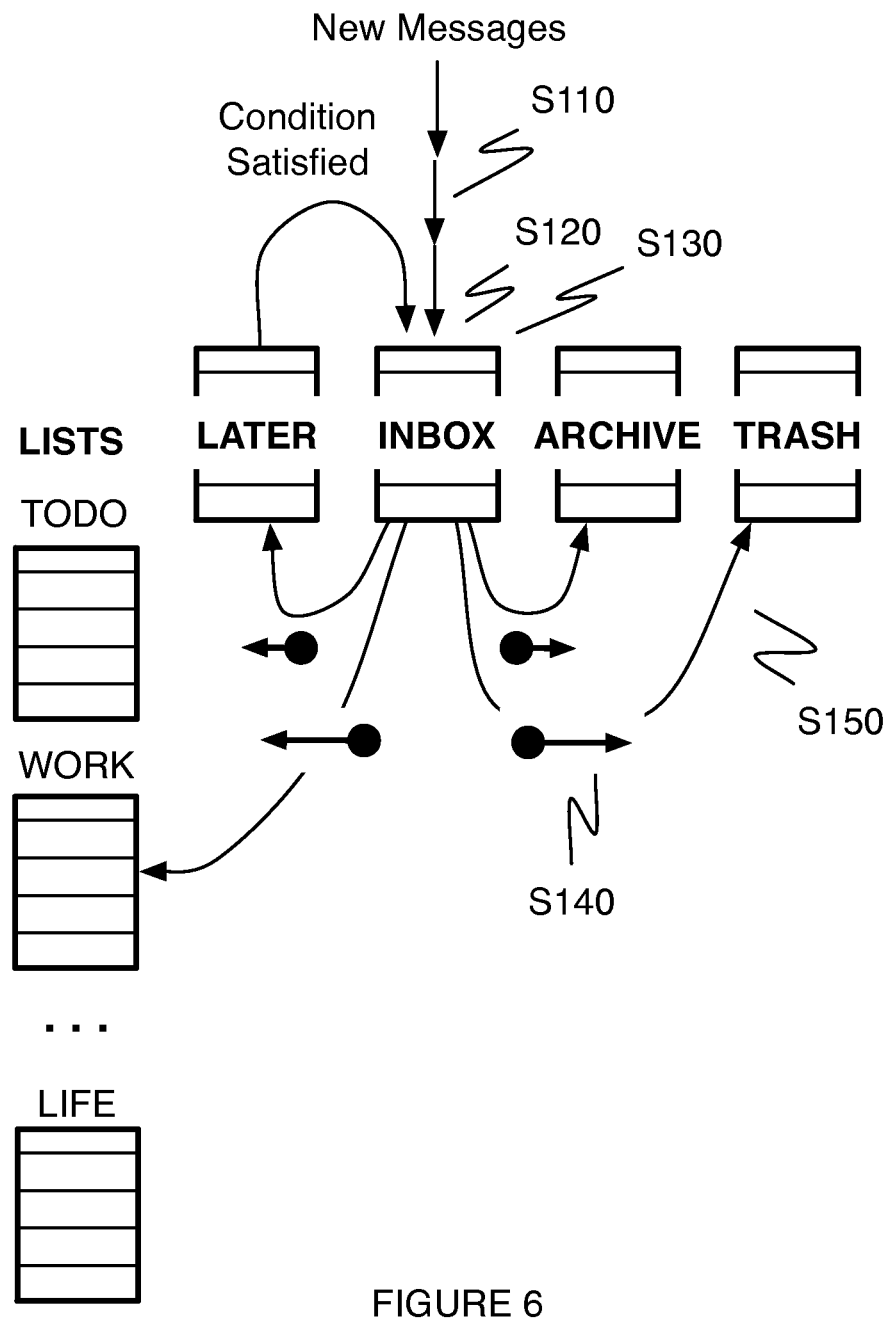
FIG. 6 is a schematic representation of an exemplary implementation of a method of a preferred embodiment of the invention.

Step S110, which includes receiving a message stream, functions to interface with a message source. A message client preferably manages the receiving of messages. The message stream is preferably a chronologically ordered list of messages of a same folder, list, tag, categorization, or otherwise grouped together. The stream may alternatively be alphabetically ordered or ordered in any suitable manner. The method can preferably act on any suitable list or stream of messages. The method may be primarily used for sorting the inbox folder of an email account, but the method may additionally be used on sent messages, other message streams, detail views of a message or message thread, or any suitable content stream to improve organization. The message stream is preferably for a messaging account, but may additionally be for a plurality of messaging accounts. Similarly, while the stream is preferably a message stream, the stream could be a notification/alert stream, a list of files in a file path, or any suitable collection of actionable items. A preferred embodiment preferably includes an inbox message stream, a conditional message stream, list streams, an archive stream, and a trash stream as shown in FIG. 6. New messages and/or updated messages (e.g., emails that have been triggered for reminding) preferably appear in the inbox message stream. The conditional message stream is preferably a deferred response list that may be customized to move a message to the mailbox stream upon satisfying a condition. In one variation the conditional message stream is a later/deferred steam for removing a message from an inbox until a particular condition is satisfied. The condition is preferably a time condition. For example, the message may be acted upon so that the message is moved to a conditional message stream and then subsequently moved into the inbox stream a week later. The condition can additionally or alternatively be based on the accessing device (e.g., phone, tablet, work computer, home computer), geographic position, proximity to other users (e.g., move message to inbox when near Angela and Alex), other actions (e.g., responded to another email), and/or any suitable condition. A list stream is any suitable grouping of messages. Preferably, a user-generated label or category is used to group messages. The archive message stream may be used for messages that generally require no more action. The trash stream preferably includes any messages that are awaiting automatic or user-initiated deletion. The method may use any suitable number of streams and types of streams. Also, the gesture-based interaction with a message of a stream may be performed on any suitable message stream.

Step S120, which includes detecting an initiated gesture for at least one message, functions to start gesture tracking that determines an action performed on a message. An initiated gesture is preferably detected after an interaction event satisfies a gesture condition which functions to distinguish gesture input from other user interaction input such as scrolling. Preferably, the gesture is initiated upon detecting at least a single touch event and then the touch point moving in a direction substantially along a first axis (e.g., in a horizontal direction). Taps or vertical swipes are preferably detected as other forms of user interaction input such as opening a message or scrolling. A message is preferably selected as the acted upon message based on the starting point of the gesture. If a touch event occurs at a coordinate of an interface that coincides with the location of a view of the message, the message is selected. In one variation, a plurality of messages is displayed in a vertically scrolling list. In another variation, a plurality of messages is displayed in a gallery grid scrolling view. As yet another variation, a plurality of messages is displayed in a stacked message view. A message can be selected for a gesture action by starting the touch gesture at the desired message and moving the touch point substantially perpendicular to the direction of scrolling (e.g., at an angle between 45° and 90° from the axis of vertical scrolling). More preferably, only the displacement of a touch event along one axis is considered in assessing gesture-state (e.g., only the horizontal x-axis is considered). When viewing a message not in a list view but in a detail view (e.g., displaying the full message or message thread), the gesture can preferably begin anywhere over the message view. In interfaces for devices with more limited screen real estate (such as watches, glasses, and other wearable computing devices), one message item may be presented at a time and so any initiated gesture would be directed at the focused item. Alternatively, a message may be selected according to any suitable heuristic.

Step S130, which includes tracking gesture-state, functions to progressively track a gesture input. An input is preferably tracked while a gesture input is in-progress. For example, a gesture recognition engine preferably updates gesture-state while a user is moving their finger on the screen. Progressive tracking of a gesture functions to allow gesture feedback as a user is performing a gesture. Progressive tracking of a gesture may additionally function to enable gestures to be reverted to a preceding gesture-state, change the set of progressive gesture-states engaged, and/or even canceled. As an alternative approach, tracking gesture-state can include tracking an input displacement along a first axis from an initial input point, mapping the tracked input displacement to a set of ordered gesture-states, and identifying an action of the mapped gesture-state. The gesture input is preferably supplied through various exposed interfaces of the device. The raw or parameterized gesture input (e.g., touch events and coordinates of a touch point) is then used to calculate the current gesture-state. As described elsewhere, a preferred variation has a second gesture-state mapped to an input displacement in a first direction of the first axis that is greater than an input displacement of a second gesture-state, and similarly a variation can include mapping a third gesture-state to an input displacement in a second direction of the first axis that is greater than that of a fourth gesture-state.

The method may additionally include displaying a graphic representation of the current gesture-state. The gesture-state graphic preferably includes text indication, color indication, graphics indication, graphic dimensional transformation, and/or any suitable visual cue for the current gesture-state. The message item preferably animates with the gesture input. In a preferred variation, the message item slides along the axis of the gesture in proportion to the gesture input. The gesture-state graphic is preferably displayed within the area revealed by the moved message item. The revealed area is the screen area that was previously occupied by content of the message and/or digital content item. When moved or translated, screen area is exposed and can be used to communicate information about the current state of the gesture. Other variations may include changing transparency of the message, deforming the message item, transforming properties of the message item (e.g., changing color), revealing overlaid icons, or other suitable approaches. The method may alternatively generate gesture-state feedback such as audio or tactile feedback. The gesture-state preferably corresponds directly with an action performed upon completing the gesture. Any suitable heuristics, conditional logic, machine learning, and/or other suitable algorithms may be used to track a gesture. Gestures may have varying progressive ranking. In other words gestures may have a first state, a second state, third state etc. The progressive ranking states may be characterized by a gesture that must first pass through a preceding gesture-state. For example, a second gesture-state may be obtained by a user making a gesture which transitions from the first state to the second state. The progress through the ordered gesture-states may be reflected in the user interface. Alternatively, a gesture engine may interpret an input as a metric for which gesture-states may be defined, and the gestures may not be detected in a progressive manner. Additionally there may be different classes of gestures. In a first preferred embodiment there are two classes of gestures, each with a first state and a second state. Gestures may alternatively be defined in any suitable manner.

Figure 7A:
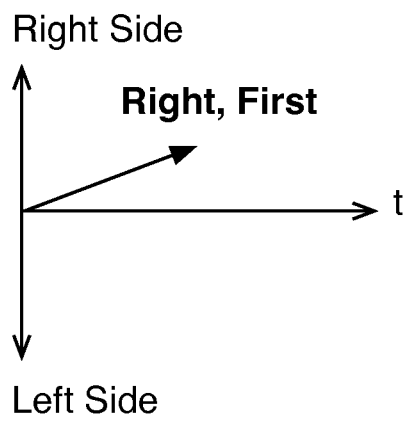
FIGS. 7A-7G are exemplary charts depicting progressive gestures states.
Figure 7B:
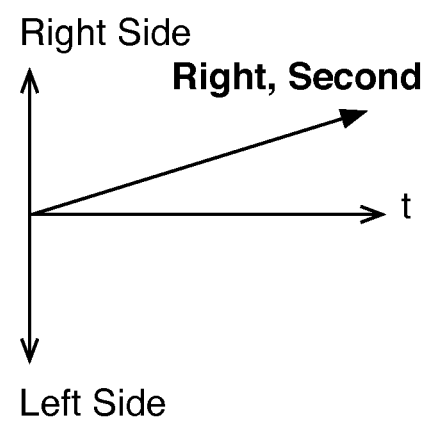
Figure 7C:
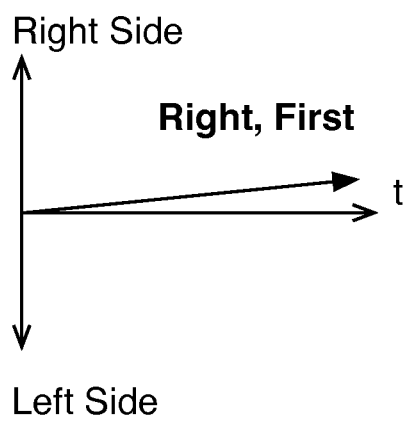
Figure 7D:
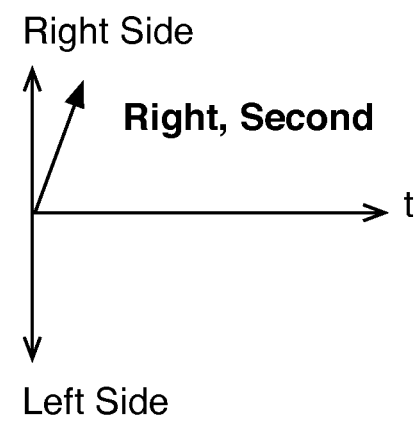
Figure 7E:
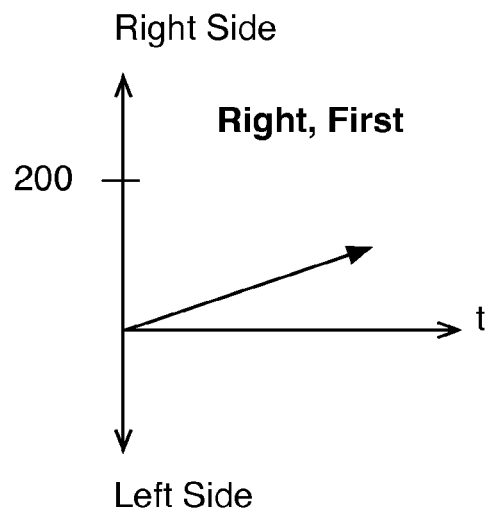
Figure 7F:
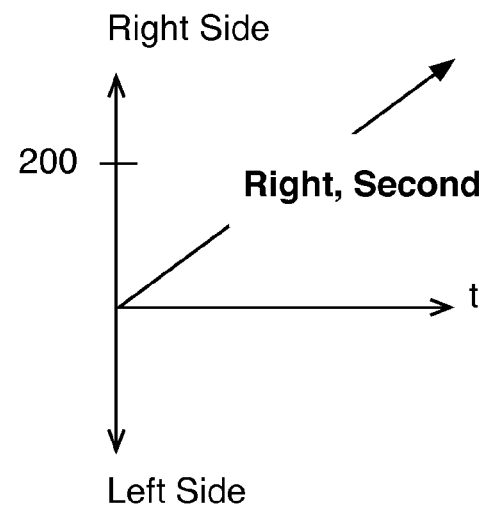
Figure 7G:
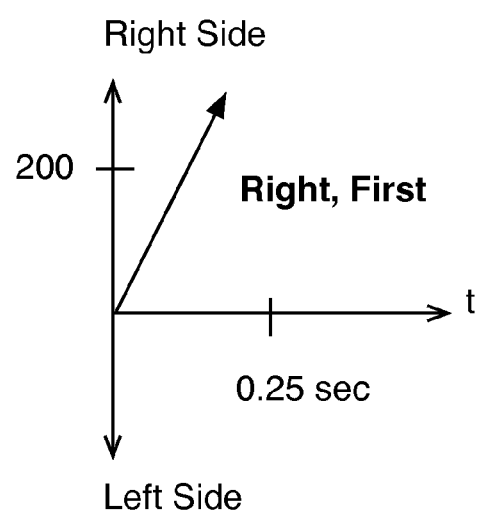

In a preferred embodiment, the method detects at least two classes of gestures each with a first and a second state (i.e., at least four different gestures). The first class of gestures may be characterized by swiping substantially to the left. The second class of gestures may be characterized by swiping substantially to the right. Here left and right define distinct directions along an axis. For both classes of gestures, the distance of the swipe, velocity, acceleration, and timing may be factored into determining if the action is a primary gesture or a secondary gesture. In general terms the swipes may be described as a short left swipe, a long left swipe, a short right swipe, and a long right swipe. An inherent gesture-state may exist for no action, which may be defined for minimal swiping in either direction. Swipes are preferably translations or displacement of at least one point of user input. A touch event starting at a point of a message view and moving substantially horizontally to the right a short distance and/or slowly is preferably a first state gesture as shown in FIGS. 7A and 7C. A touch event starting at a point of a message view and moving to substantially horizontally to the right a long distance and/or with high acceleration is preferably a second gesture as shown in FIGS. 7B and 7D. As another variation, timing of the touch motion may impact the gesture-state. For example, each pause in motion during a swipe may transition to a new gesture-state. This may function to enable a user to make higher order gestures by pausing several times. In a similar variation, changes in direction of a gesture may be used to transition between higher and/or lower order gestures. For example, a touch that zigzags back and forth may be used to shift between different orders of a gesture-state. The thresholds between different gesture-states can additionally be tuned according to user expectations. The thresholds can alternatively be automatically set in different application instances according to individual user patterns. The threshold between two gesture-states in a first direction can be proportional to the input mechanism used to generate the gesture input. On a touch screen the input mechanism is commonly a single finger, but may alternatively be multiple fingers or a stylus. In a vision-based system, the input mechanism can be a full hand, arm, controller object, or any suitable visually tracked object. A first gesture-state is preferably activated when the gesture input has traveled a distance of approximately the width of an average input mechanism (75%-125% width of average input mechanism). The second gesture input activates to a second progressively ordered gesture-state when the gesture input has traveled a distance approximately three times the average input mechanism width. If an average input mechanism is given a unit of one, then the transition between the first and second gesture-states can occur between 2 and 4 units, with three being preferred. On a touch device, this can equate to roughly thresholds of 60 pixels and 200 pixels on a screen with a resolution of 163 ppi. In one exemplary implementation, the threshold between gesture-states in a direction is 200 screen units (e.g., 200 pixels or 400 pixels on a high resolution screen). Swipes to the right less than 200 are preferably a first gesture-state as shown in FIG. 7E, and swipes to the right greater than 200 are preferably a second gesture-state as shown in FIG. 7F. Additionally, a first gesture-state is preferably active for a minimum amount of time (e.g., 250 milliseconds). In other words gesture input swipes that are completed/terminated in less than 250 milliseconds (e.g., relatively fast swipe) are interpreted as a fast swipe as shown in FIG. 7G, which is based on user patterns where a quick swipe was intended for the first progressively encountered action as opposed to interpreting it as a more forceful gesture to indicate a secondary gesture-state. The time threshold may alternatively be any suitable value to mark a fast or quick gesture. Such time limits may be based on the type of device and/or input sensing approach of a device. Other conditions for gesture sate detection may alternatively be used. As mentioned above gestures may be from inputs other than touch devices. For example, device sensor input may be used similarly. In one embodiment, tilting a device to the right may indicate a class (e.g., right or left gesture), and translating the device will progress the gesture through the gesture-states. Performing a touch input that transitions across the edge of the screen may additionally be used as a condition for setting gesture-state. Detecting gesture input that transitions across the edge of the screen preferably includes transitions onto the touch sensitive area or out of the touch sensitive area. In one variation, detecting a transition onto the touch area would be when the initial touch input position is substantially close to the edge of the screen. Detecting a transition off the touch area would be when the final touch input position is substantially close to the edge of the screen. Other gesture-state modifiers may be the number of touch inputs. For example, the number of fingers on the display may augment the gesture-state. Any suitable gesture heuristics may alternatively be used.

Step S140, which includes identifying an action of the gesture-state, functions to map an action to the detected gesture. Each gesture preferably corresponds to an action to perform on a message. Additionally a plurality of gestures may correspond to a single action, which may function to enable different variations of a gesture to result in the same action. For example, a primary gesture may include a short quick swipe to the right or a long slow swipe. The actions are preferably sorting actions for the message. For example, the actions may include moving to an archive, the trash, a custom list, a reminder stream, a starred/marked stream, a task list, and/or any suitable stream/directory/category. In one preferred embodiment, the gestures correspond to actions that also correspond to stream navigation. For example, the list navigation is preferably configured to reinforce or represent a right to left arrangement of streams with the main inbox centrally positioned. For example, moving a list to a custom list from the inbox preferably requires a long swipe to the left, and the custom list may be accessed and viewed by selecting a button to the far left. Thus, the navigation and gesture are in agreement by reinforcing a far left position of the custom list.

Some streams may modify the message or perform conditional logic on the management of the message. A message may be added to a reminder stream that will conditionally move the message out of the reminder stream after a condition is satisfied. The condition is preferably an amount of time but may alternatively be according to geo-location of the user, absolute geo-location of other users, geo-location of users relative to the device user, response by another recipient of the message, response to another message, device access (e.g., next time on desktop computer), a combination of Boolean logic for multiple conditions, programmatic logic (e.g., accessed through application programming interface (API)), and/or any suitable conditions. The message is preferably moved into an inbox after the condition is satisfied but the message may be moved to any suitable location or acted upon in any suitable manner. For the marked list, a mark or indicator (e.g., star/important label) may be applied to the message.

Step S150, which includes applying a message action on the message according to a final gesture-state, functions to apply the identified action on the message. The final gesture-state is determined by when the gesture input ends. The method can include upon detecting an end of the gesture input, selecting the action mapped to the current gesture-state as the selected action. For touch devices, removing a touch point of contact ends the gesture input. The actions are preferably message sorting actions. As mentioned above, the sorting actions may include moving to an archive, the trash, a custom list, a reminder stream, a starred/marked stream, a task list, and/or any suitable stream. The actions may alternatively include replying to a message, forwarding the message, adding the message to a calendar, sharing the message through an alternative form of communication (e.g., social media, SMS/MMS messaging), transferring contents to an application, and/or any suitable type of action. The actions can directly correspond to actions of a messaging service. For example, adding a message to a list may include moving or copying an email to an email folder. In some cases, a folder system may be generated on a messaging service to accommodate the list architecture of the application. In some cases, the architecture of message organization may be transparently generated by the system of the email client. In other words, the organization of the messages may not be transferred to the messaging service and may not be reflected in the user interface provided by the original messaging service. Applying the message action on the message according to the final gesture-state may additionally include animating a message transition. The animated message transition is preferably the message animating out of the stream in the direction of the swipe. In some cases this direction also corresponds to the direction of the destination message stream view.

Additionally, the method may include retrieving action-option selection. The action-option selection view preferably enables a user to customize the action by setting a parameter of the action. The action-option selection is preferably a secondary view that is displayed directly after completion of a gesture. The action of moving a message to a reminder stream preferably triggers the display of an action-option selection view allowing a user to specify an amount of time to wait or a particular time when the message should be moved into the inbox. The action of moving to a custom list preferably has an action option selection view allowing a user to select or create a new list to which the message will be added. Preferably the actions are fixed to set gestures. Alternatively, actions may be updated based on the currently viewed message stream. The gesture-state to action mapping is preferably re-indexed to correspond to the navigational displacement. For example, the actions may rotate so that a swiping direction always maps to the cognitive mapping of the navigational location of a particular list. In one implementation, navigational order is list streams, reminder stream, inbox stream, archive stream, and trash stream. When in the inbox, a short swipe to the left is the reminder action (towards the reminder stream one to the left), a long swipe to the left is the list sorting action (towards the list streams two to the left), a short swipe to the right is the archive action (towards the archive stream one to the right), and a long swipe to the right is the delete action (towards the trash stream two to the right). If the user navigates to the archive stream, the actions are rotated or re-indexed such that a short swipe to the left is the add to inbox action (towards the inbox stream one to the left), a long swipe is the reminder action (towards the reminder stream two to the left), and a short or long swipe to the right is the delete action (towards the only stream to the right). When viewing other streams, the actions can be re-indexed in a similar manner.

Figure 8:
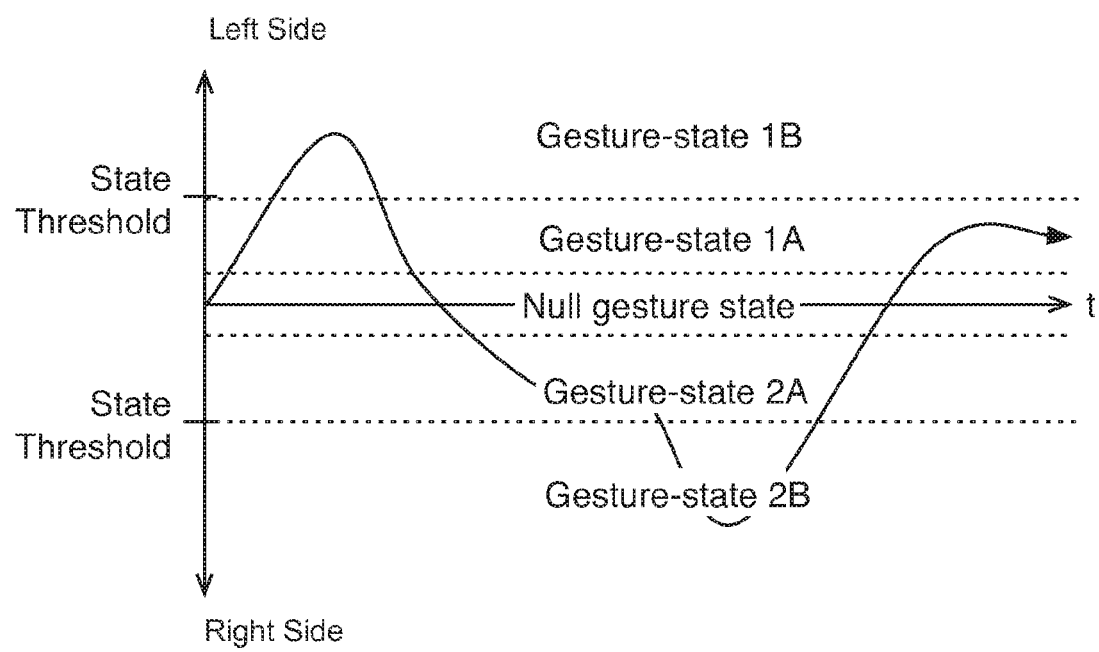
FIG. 8 is an exemplary chart depicting a gesture input progressing through various gesture-states.

In an exemplary use-case shown in FIG. 8, the method functions to show the manner in which the progressive gesture-states can be used by a user to flexibly select different item actions. With a single swiping gesture, the user can survey different action options, change his mind, and even engage different classes of ordered gesture-states. This scenario is meant as an example representing some of the affordances of the method, but the method is not limited to just this scenario. A user touches a message item initiating a gesture input. At this stage the user has not moved in a significant horizontal direction and thus the gesture-state is for no action. The user then moves his point of contact to the left 165 screen units (e.g., pixels) to the left. The message preferably slides partially to the left. At this stage the gesture-state is a first gesture-state 1A. The corresponding action is preferably graphically displayed in the screen area revealed by the message sliding partially to the left. The user then moves his point of contact further to left of 300 screen units to the left of the initial touch point. The message graphically slides further to the left proportional to the touch displacement. Movement of 300 screen units in this example is past a gesture-state threshold, and the gesture-state progresses to a second gesture-state 1B. The action of the second gesture-state is graphically displayed in the area to the right of the message, replacing the graphical indicator of the first gesture-state. The user may change his mind and move his finger to the right 135 screen units—the current touch input at 150 left of the initial touch point. The message slides to the right in proportion to the updated gesture input, and the gesture-state progressively reverts to the first gesture-state 1A. The user then moves the input to substantially the initial touch point. The message slides to hide any indication of a gesture-state, and the current gesture-state is not mapped to any action. The user is in a position to cancel the gesture input. The user can then move his finger in the opposite direction, 130 screen units to the right and engage another set of progressively ordered gesture-states. The message slides to the right, and a graphical indicator of an action of a third gesture-state 2A is displayed in the area to the right of the slid message. The user can then move the touch input further to the right to 250 screen units, and the gesture-state changes to a fourth gesture-state 2B. The user can continue changing the gesture-state within the limitations of the detected gesture-states. If at any point the user removes his finger, the gesture input is terminated and the action of the current gesture-state is preferably performed.

In one exemplary embodiment, an email client application preferably provides an opt-out form of email inbox management. The application allows users to quickly and intuitively sort mail so that they can respond to it at the right time and/or context. Typically a user would use the application with the goal of maintaining a clean inbox. The email client application preferably configures 5 types of email streams: an inbox, a later stream, a list stream, an archive stream, and a trash.

Figure 9A:
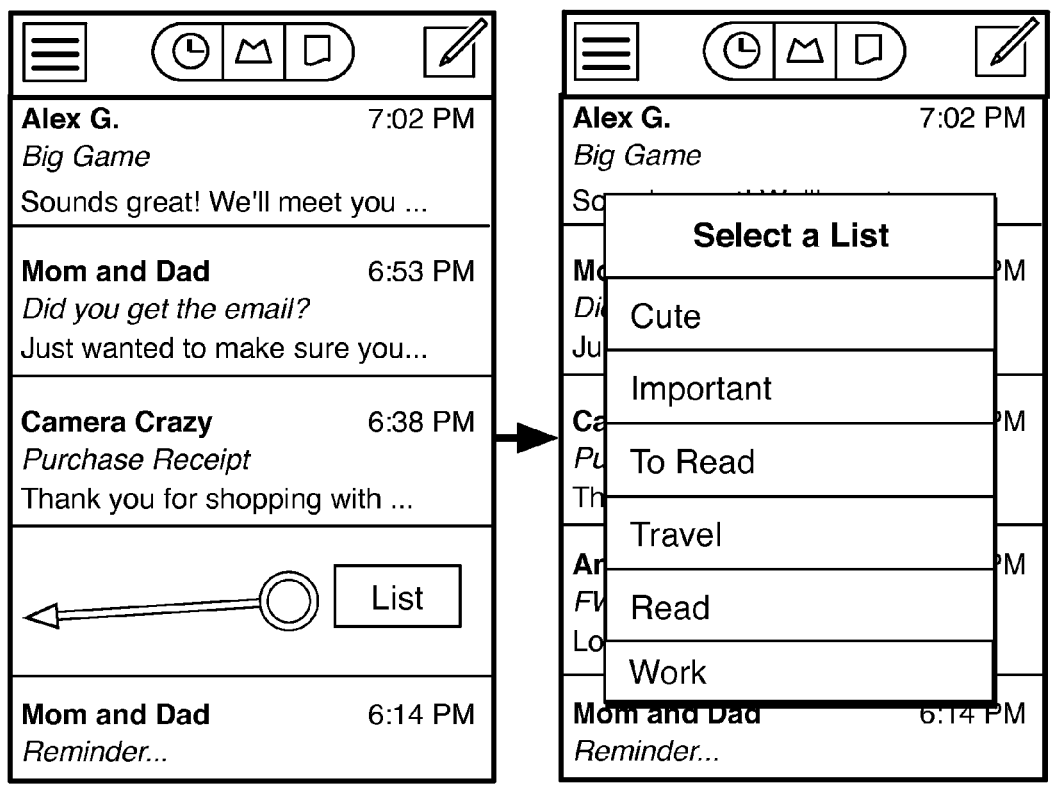
FIGS. 9A-9E are exemplary schematic representations of a preferred embodiment of the invention.
Figure 9B:
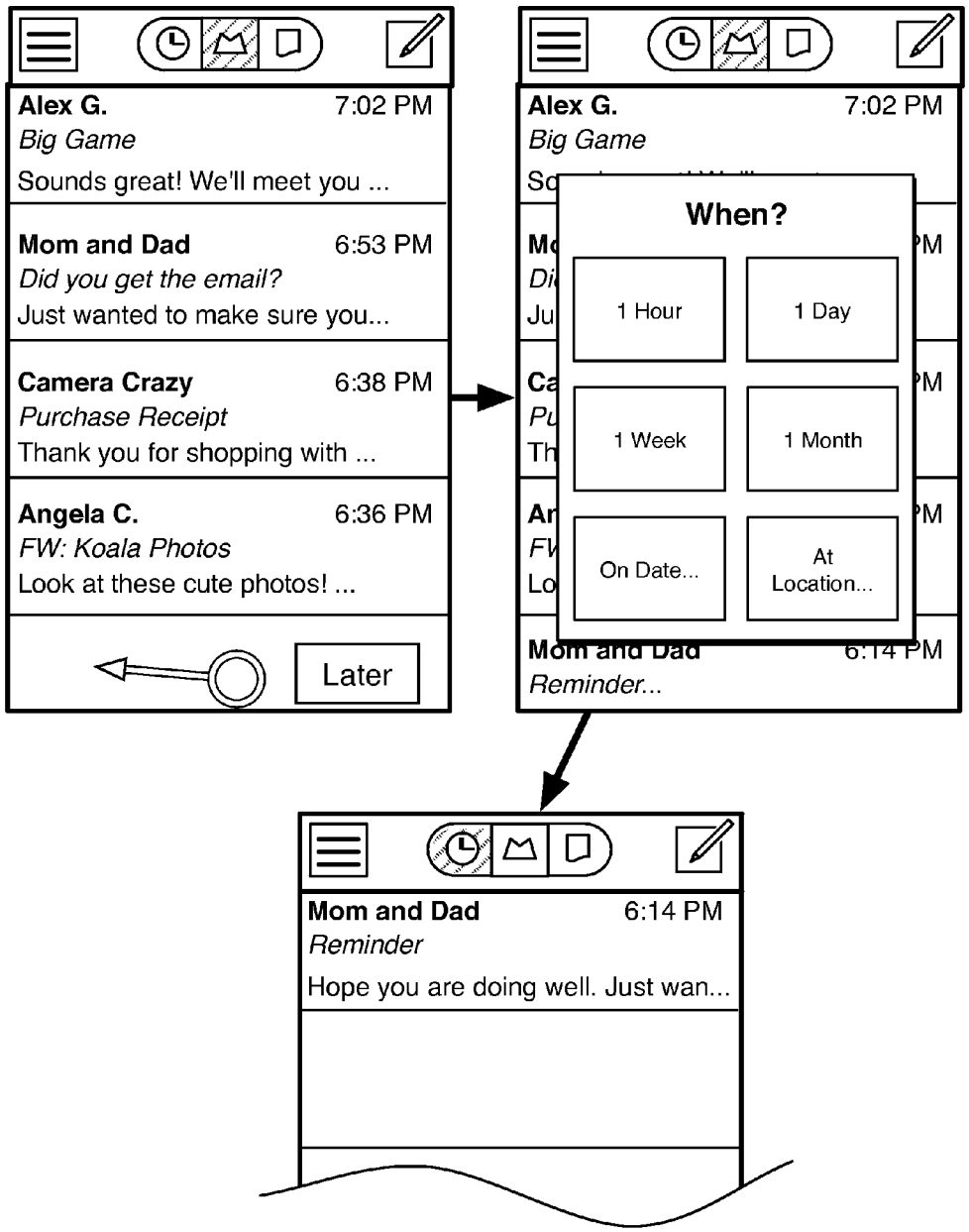
Figure 9C:
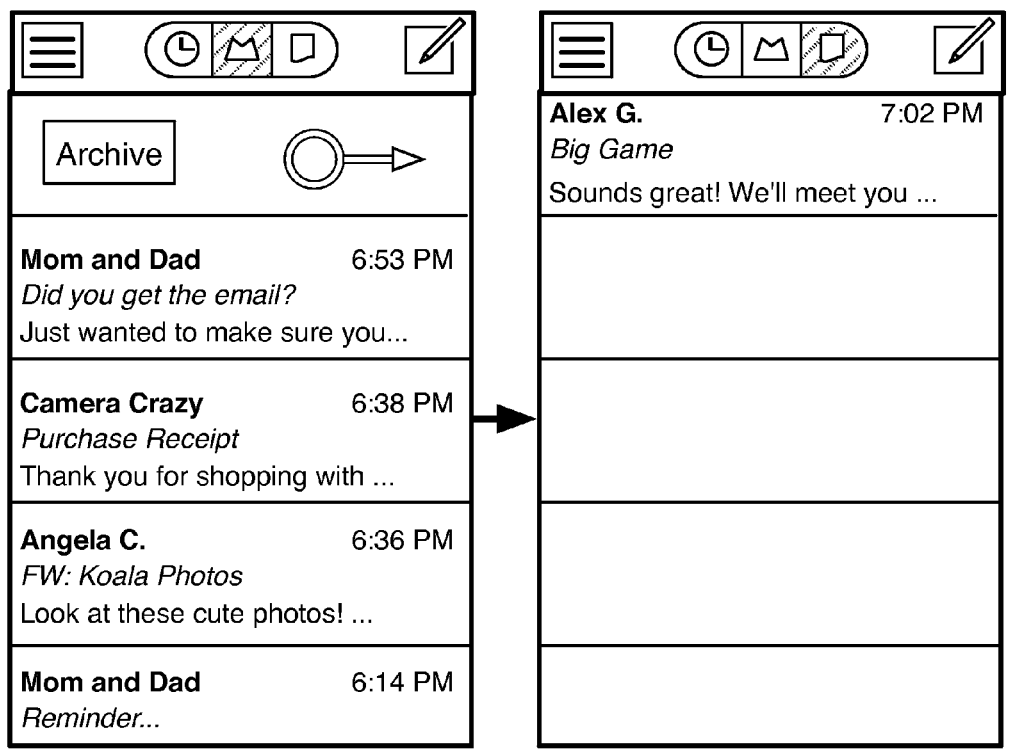
Figure 9D:
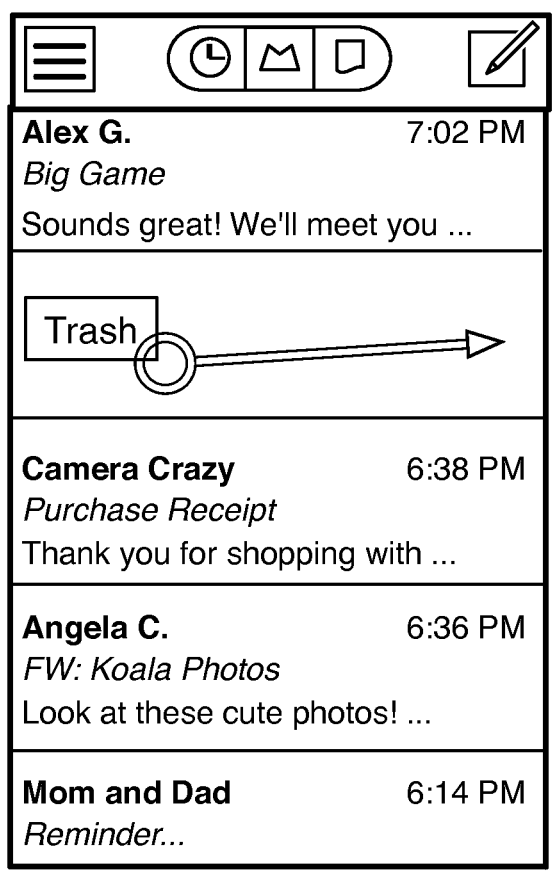
Figure 9E:
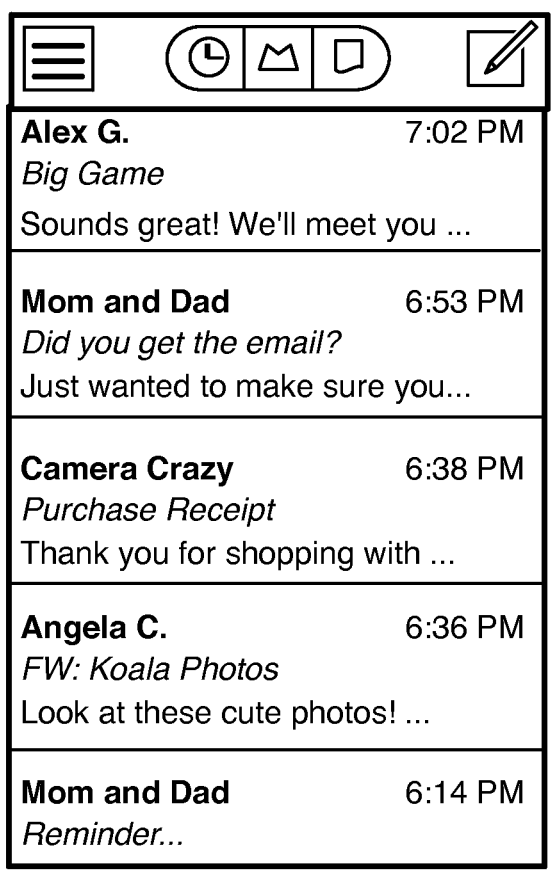

The gesture to action mapping of the application preferably includes: a long swipe to the left to move a message to a list stream as shown in FIG. 9A; a short swipe to the left to move a message to the later stream as shown in FIG. 9B; a short swipe to the right to move a message to the archive stream as shown in FIG. 9C; and a long swipe to the right to move a message to the trash as shown in FIG. 9D. As mentioned above, the stream navigation preferably corresponds to gestures to action mapping. In a navigation view, such as a navigation bar at the top, there is preferably a button to the far left to display a list of list streams as shown in FIG. 9E. In the middle of the navigation view there is preferably a split button with buttons from left to right to display the later stream, inbox stream, and archive stream as shown in FIG. 9E. This left to right organization of stream navigation preferably reinforces the mental model of the gesture to action mapping.

The primary email stream is the email inbox where new mail and email reminders are added. The inbox is preferably the home screen or the initial screen viewed when opening an app. Ideally, the majority of email sorting will be performed from the inbox. The list stream is preferably a collection of streams for various lists. The list stream may be user created and/or pre-created lists. A list is preferably beneficial to a user by allowing the user to file the message so that the user can view the message at a time of his or her choosing. A list stream is preferably one of several labels, categories, folders, tags, groups, or other message organization mechanisms. Sorting a message to a list stream preferably sorts the message into at least one specified list stream. The user preferably sets an action-option selection to specify the destination list of a message as shown in FIG. 9A. The later stream is preferably a conditional stream for messages that will be conditionally added to the inbox a subsequent time. When adding a message to a later stream, a user preferably makes an action-option selection specifying when or according to what condition the message should be added to the inbox as shown in FIG. 9B. The later stream preferably helps users by deferring a response to an email until an appropriate time. The archive stream is a general stream for messages that no longer need a response. The trash is preferably a message stream for messages to be deleted.

In alternative exemplary embodiment, an email client application preferably provides an opt-in form of email inbox management. The application allows users to quickly and intuitively sort mail so that they can mark messages that need a response. Typically a user would use the application with the goal of marking all messages requiring a response. This variation is substantially similar to the one described above except that in place of a later stream, a marked stream preferably allows messages to be marked with specific labels such as a star, an important symbol, respond-to symbol, or any suitable label. Additionally the marked stream may be used in combination with the first exemplary embodiment described above or with any suitable alternative variations.

Figure 10A:
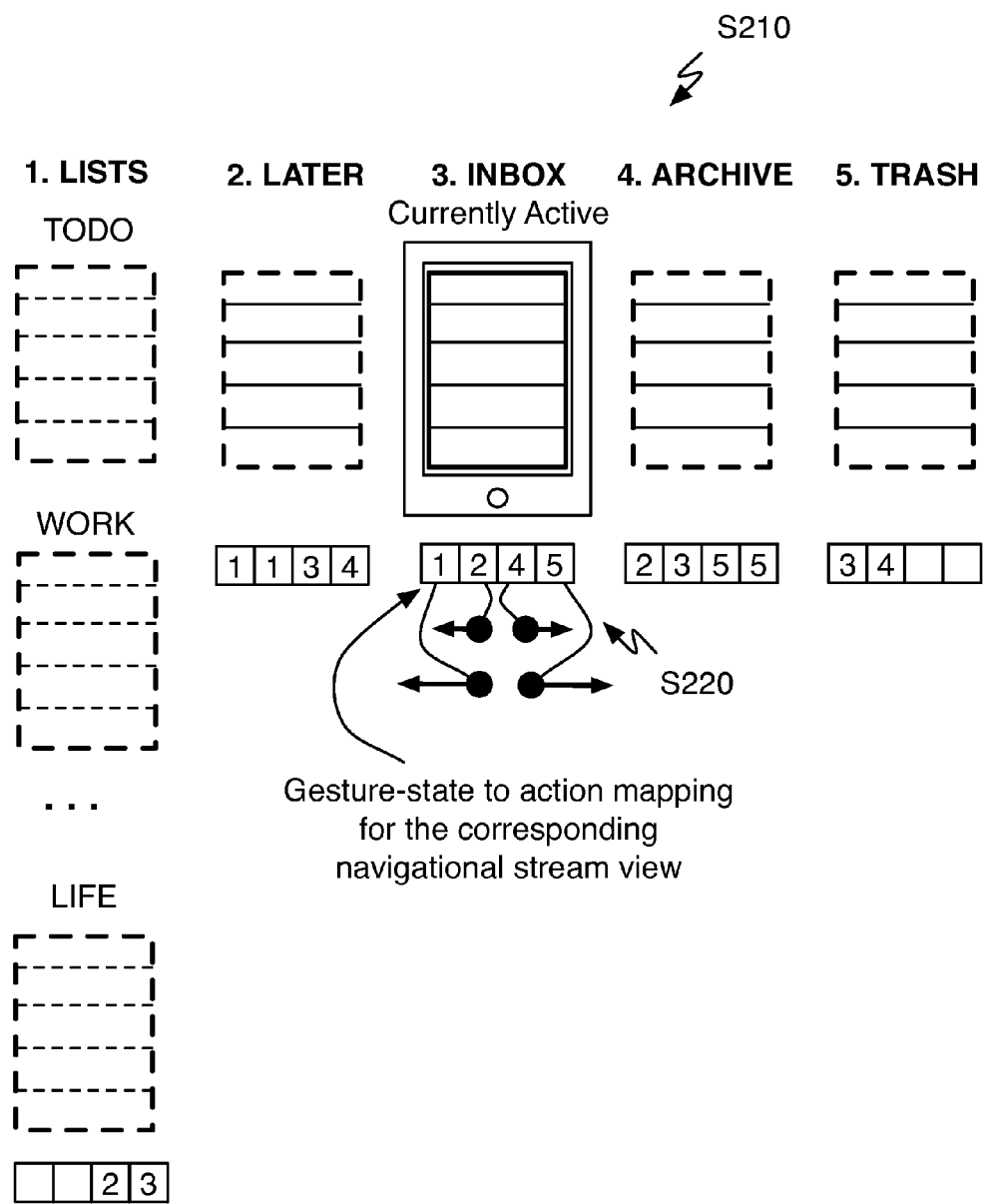
FIGS. 10A and 10B are schematic representations of a method of a second preferred embodiment.
Figure 10B:
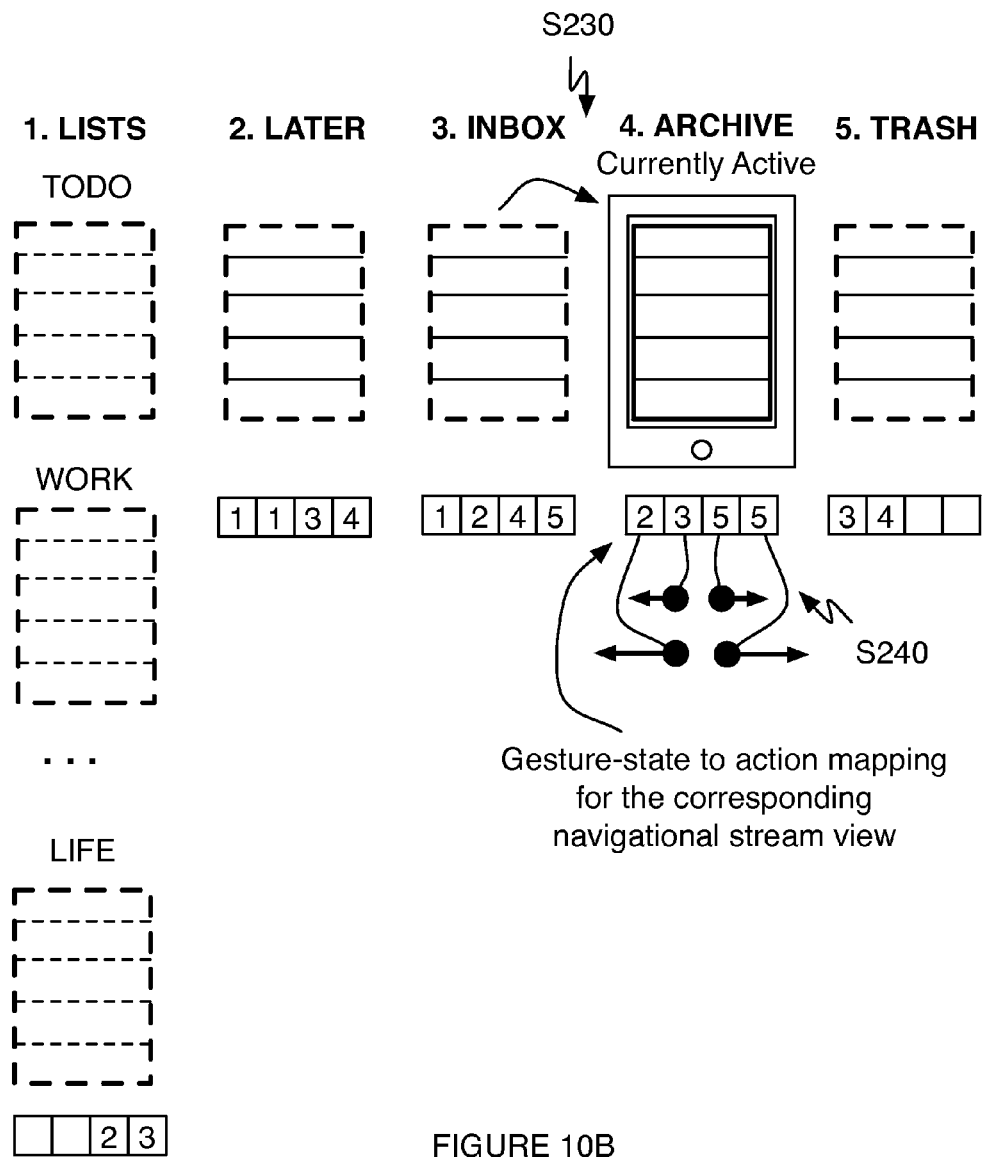

As shown in FIGS. 10A and 10B, an alternative method S200 description of the above method for organizing messages of a preferred embodiment can include providing a set of navigation views with an active navigation view S210; at message items of a navigation view, detecting an ordered set of gesture-states mapped to an actions that correspond to the order of navigation views S220; transitioning the active navigation view S230; and re-indexing the ordered set of detected gesture-states S240. The method functions to emphasize the navigation driven aspect of the detected gesture-states. The tracking of gesture input and actions applied to messages are preferably substantially similar to the method described above. The navigation views are preferably modal views of different content collections. In other words, only a single navigation view or pane is active at a time, and the other navigation views are graphically simulated to exist in set positions relative to the other navigation views. The simulated positions are preferably reinforced by graphical animations between the navigation views. Accessing the navigation views can be achieved in any suitable manner. In one variation, a series of navigation buttons in a navigation bar may provide ways to access the views. As an example the navigation views may include a list view (to access a collection of list views), a later view, an inbox view, an archived view and a trash view. When a new navigation view is selected for activation, an animation preferably simulates either a right or left animation corresponding to a set order of the navigation views. The order of the navigation views additionally corresponds to the index of actions within the gesture-state options. As described above, four possible gesture-states may be configured for detection (not including the neutral gesture-state of canceling a gesture input). The mapping of gesture-states to actions is remapped to reflect the "position" within the set of navigation views. The navigation views and the corresponding action mapping are preferably not cyclical. For example, the trash view may be the navigation view to the far right with the archive view directly to the left and the inbox view two views to the left. When viewing the trash view, swipes to the left preferably move the message to the archive (for a first state) or to the inbox (in a progressively acceded second gesture-state). Swiping to the right may not invoke any action. In one variation, swiping to the right invokes a deletion action for that message (as opposed to just moving it to the trash). In some variations, the navigation views may occupy the same navigational order or index. For example, the list view and the archive view may both be treated as being one to the left of the inbox view. As another alternative, when at the end of a set of navigational views (e.g., the far left navigation view), a gesture-state, which would otherwise be blank, can be set to another defined action (such as a common action like archive).

3. Method for Interacting With Digital Content

Figure 11:
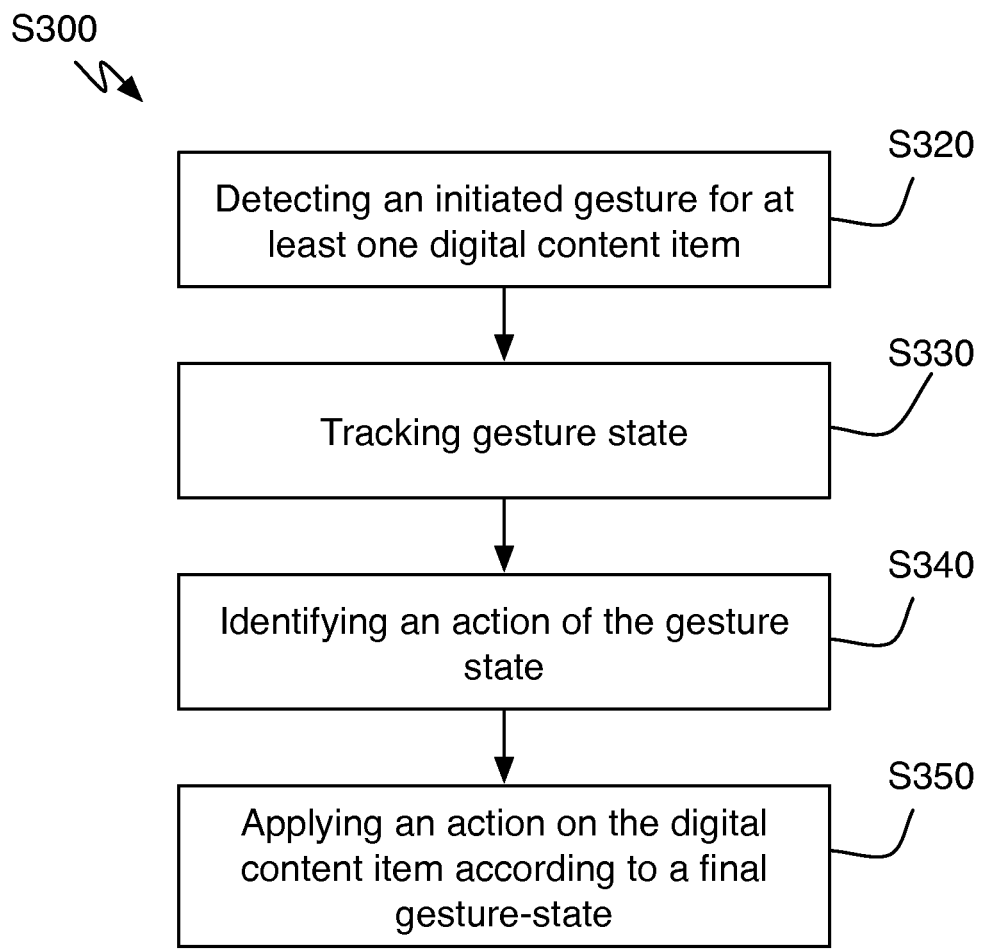
FIG. 11 is a flowchart representation of a method of a third preferred embodiment.

As shown in FIG. 11, a method S300 for interacting with digital content of a preferred embodiment can include detecting an initiated gesture for at least one digital content item S320, tracking gesture-state S330, identifying action of a current gesture-state S340, and applying an action on the digital content item according to a final gesture-state S350. The method S300 is preferably substantially similar to the methods above but implemented in other contexts other than messaging applications. Blocks S320, 330, 340, and 350 are preferably substantially similar to blocks S120, S130, S140, and S150 except as applied to other forms of digital content. Similarly, the method S300 is preferably implemented by a system substantially similar to the above system. The method S300 may alternatively be implemented as an interactive service of an operating system or some suitable platform as opposed to within a self-contained application environment. The digital content can be media file items (photos, video, music, and the like), files of a file system, notifications or alerts from various sources, and/or any suitable digital content. In the context of messages and specifically email, the actions are preferably sorting/organizing related actions, which can be applied to digital content in a similar manner. Alternative actions for digital content can include sharing content, synchronizing the content between different devices or people, queuing the digital content, performing a transformation on the content, altering meta data to the content. Some of these actions may include displaying a secondary view with action options (similar to the variations of the later and list actions above). For example, a sharing action may initially trigger a secondary view with a list of different social media sites and communication channels to share the content over. The secondary view for selecting options of the action can have any level of complexity. Transforming content can include actions such as applying an image filter to an image, translating a message, encrypting a message, converting file format, and/or any suitable transformation. Altering meta data can include changing privacy settings, geo-tagging the content, starring or labeling content, and/or changing meta data in any suitable manner.

The method S300 can include the navigation-to-action correspondence described for the above system and methods, but the gesture tracking components can alternatively occur independent of a navigational architecture that defines the actions. In one variation, the actions are preferably related to the properties and/or state of the digital content item being acted upon. This may or may not include dependence on the navigational views. In one variation, identifying an action mapped to the current gesture-state comprises identifying an action mapped to the current gesture-state based on an application navigational context. Depending on the current "location" or context of an application or operating system different actions may be enabled or mapped. In one variation, identifying an action mapped to the current gesture-state includes identifying an action mapped to the current gesture-state based on a content type of the digital content item. For example, a thumbnail of a picture may have different gesture-to-action mapping than a text document. Similarly, the gesture detection can be implemented within an application, for a portion of an operating system service (e.g., a notification center), as a universal gesture tool that can be applied to any file or defined forms of content, as a tool to be leveraged by developers, or implemented in any suitable environment.

Additionally, the method S300 may include simultaneously receiving input S360, which functions to enable multiple users/devices and/or multiple digital items to receive progressive gestural input. In one variation, multiple gesture inputs can be applied to items simultaneously or in overlapping time sequence. In other words translation of a gesture applied to an item is interpreted independently from gestures applied to one item. For example, two items may simultaneously receive touch gesture input and based on the final gesture-state both receive an action. The final gesture-state may be the same gesture-state but may alternatively be different final gesture-states, which would result in different actions being applied to the two messages. In a similar example, received gesture input may overlap in time: a first gesture input may be initiated for a first item. After initiating the first initiated gesture and before completing the gesture, a second gesture input maybe initiated for a second item. In this way, gesture inputs do not block or prevent gestures being applied to other items. This aspect may be invoked so that one user can perform several gesture inputs at once, but it can similarly be applied so that multiple people can collaborate on one device.

Figure 13:
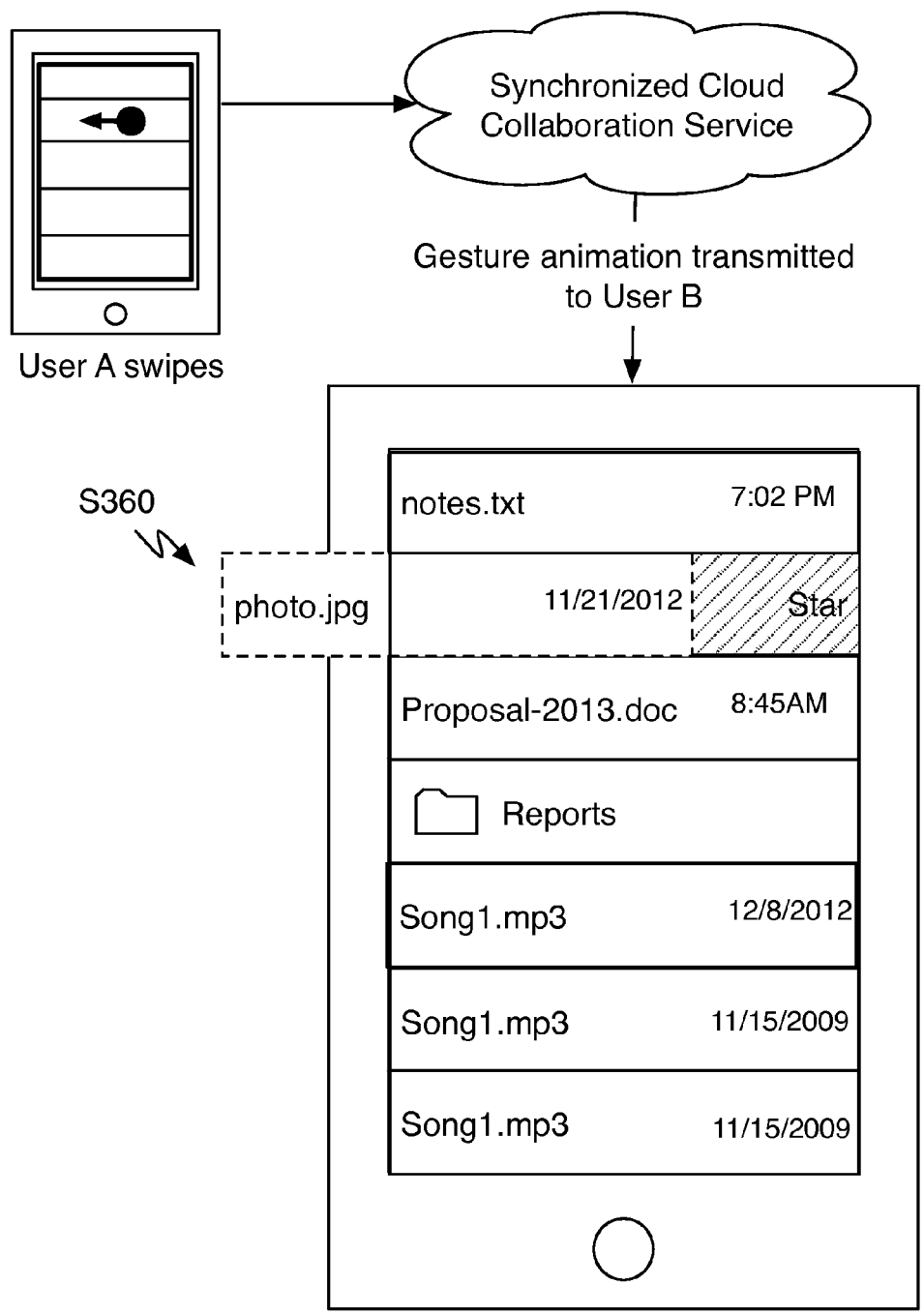
FIG. 13 is a schematic representation of an exemplary file system implementation being used with remote received input.
Figure 14:
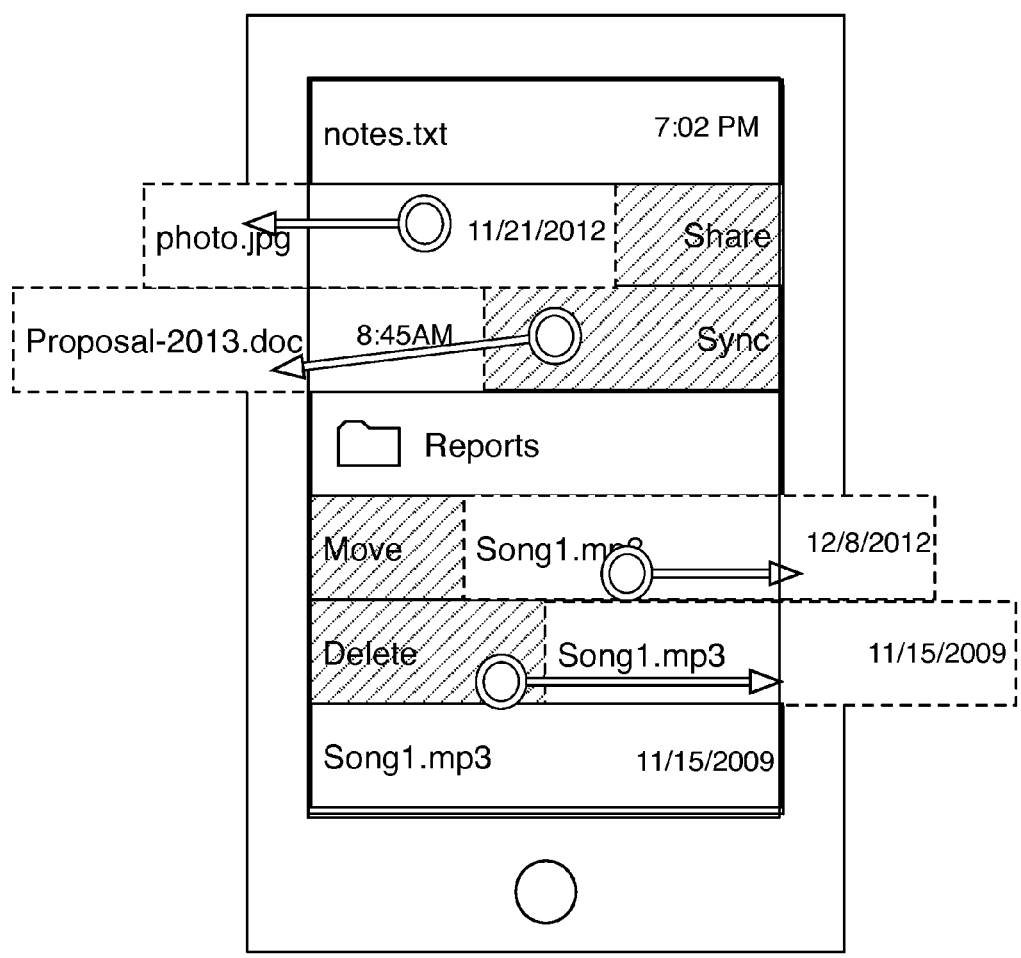
FIG. 14 is a schematic representation of an exemplary gesture-state to action mapping of a cloud based file system implementation.

In another variation shown in FIG. 13, block S360 can be used in multi-device collaboration. Where, in traditional user interfaces, a user may click a button and the action instantaneously happens, the progressive gesture interface uses numerous visual cues that correspond to the action performed or about to be performed on an item. This aspect lends itself to real-time collaboration on shared resources. The gesture input of a second user (on a second device) can be graphically reflected across multiple devices. In particular the sliding animation of the digital content and the gesture-state graphic are indicators of what is about to happen, and animating the digital content off the screen can indicate which action was committed. In one variation, collaborators can even compete over the gesture-state, where a user can add to or subtract gesture input from a gesture input, which can function to enable a tug-of-war interaction over the gesture-state. For example, while talking a user may touch a digital item and move 100 screen units to activate a first gesture-state and pause while discussing. The second user may disagree with this action and tap the item and move 100 screen units in the opposite direction to cancel the action. If the second user moved a 100 screen units in the same direction as the first user, then a second gesture-state may be engaged. Thus, the method may include receiving multiple gesture inputs simultaneously.

Figure 12:
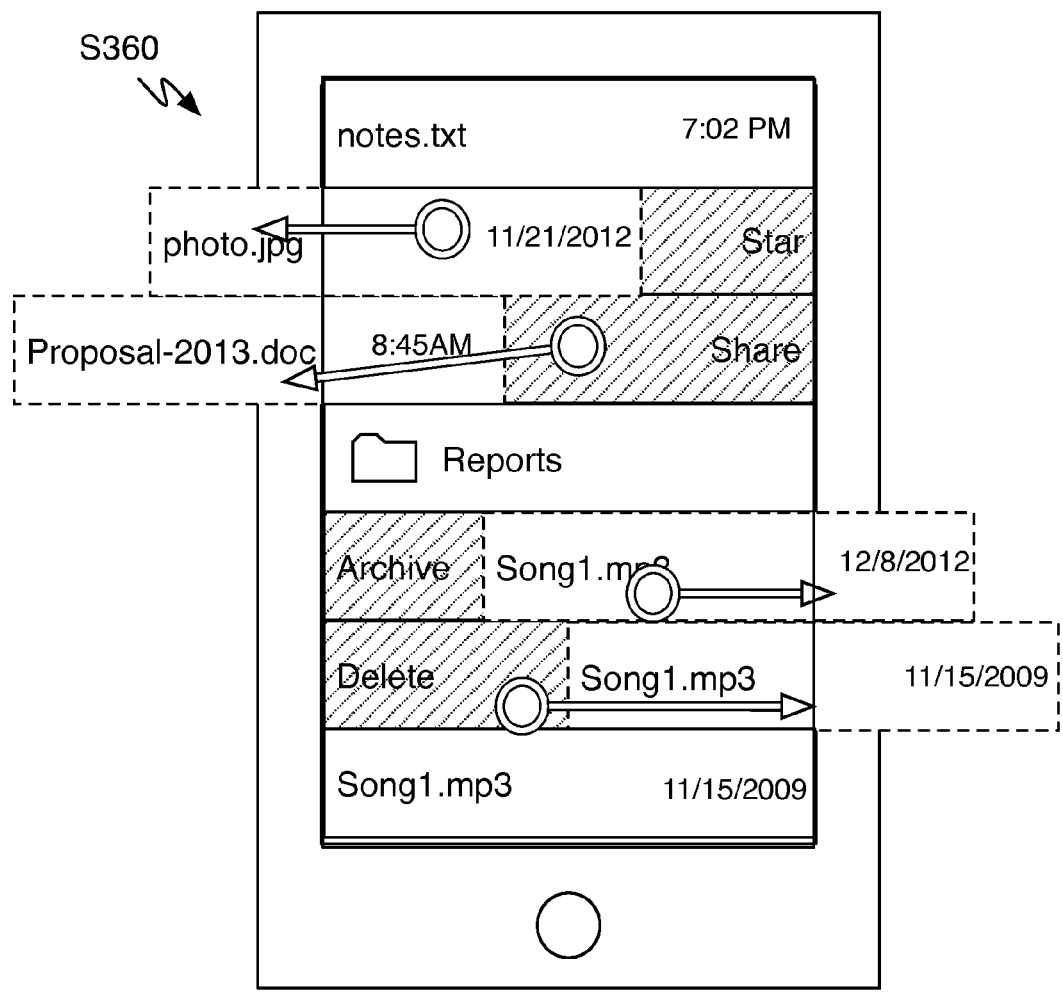
FIG. 12 is a schematic representation of an exemplary file system implementation being used with simultaneously received input.

As shown in FIG. 12, an implementation of method S300 can be applied for file system related contexts. In this implementation, file items (e.g., file icons/thumbnails or actually opened file content) can be reactive to progressive gesture inputs. The file system can be a file system of a device such as a mobile device, a desktop computer, a remote file system, a shared file system, or any suitable file system or drive. There are preferably at least two gesture-states and two actions, but any suitable number of gesture-states may be configured. In one example, the gesture detection is used in a use-case similar to the messages above. There are a limited number of high priority actions that correspond to different organizational issues. There can be an action to move the file (similar to the list option), wherein if the move action is selected, the user specifies a folder or location to store the digital content item. There can be a later action, to temporarily store the file elsewhere until conditionally moving the file where the user will notice the file (e.g., in a new content folder). There can be an archive action to store the file in a default location. And there can be a trash action that moves the file to the trash or deletes the file. Since files may have different affordances other actions can be used. For example, there may additionally or alternatively be a synchronize action. The synchronize may be used to synchronize a file between devices. Preferably a secondary view is displayed with different device/location options where the file should be synchronized. In the case where the file system is a cloud based file system that synchronizes files between multiple devices, the synchronize action can be used to selectively decide if the file should be kept local or if it should be uploaded and synchronized with all or some other devices. For example, the file may be a very large file, that only one other device will ever need access to. A user can simply use this option to set this file to only be synchronized with the device of interest. There can be a sharing option. The sharing option either activates a default sharing option or can display in a secondary view various sharing options. Sharing options can include posting to a social network, email, SMS messaging, MMS messaging, sharing through an application communication channel, inviting select people to collaborate/access the file, or share in any suitable manner.

As one example, a first gesture-state may be mapped to moving the file to a set folder; a second gesture-state may be mapped to setting which devices the file synchronized with for an account; a third gesture-state may be mapped to sharing the file with at least a second user; and a fourth gesture-state may be mapped to archiving or deleting the file. Other alternative or additional actions may include rating the file, marking the file, performing actions specific to the file type, and/or performing any suitable file related action. One aspect of the gesture interface is that animations and graphics correspond to the actions. As an additional variation, actions can be applied to folders or a selection of files as well as individual files.

Figure 15:
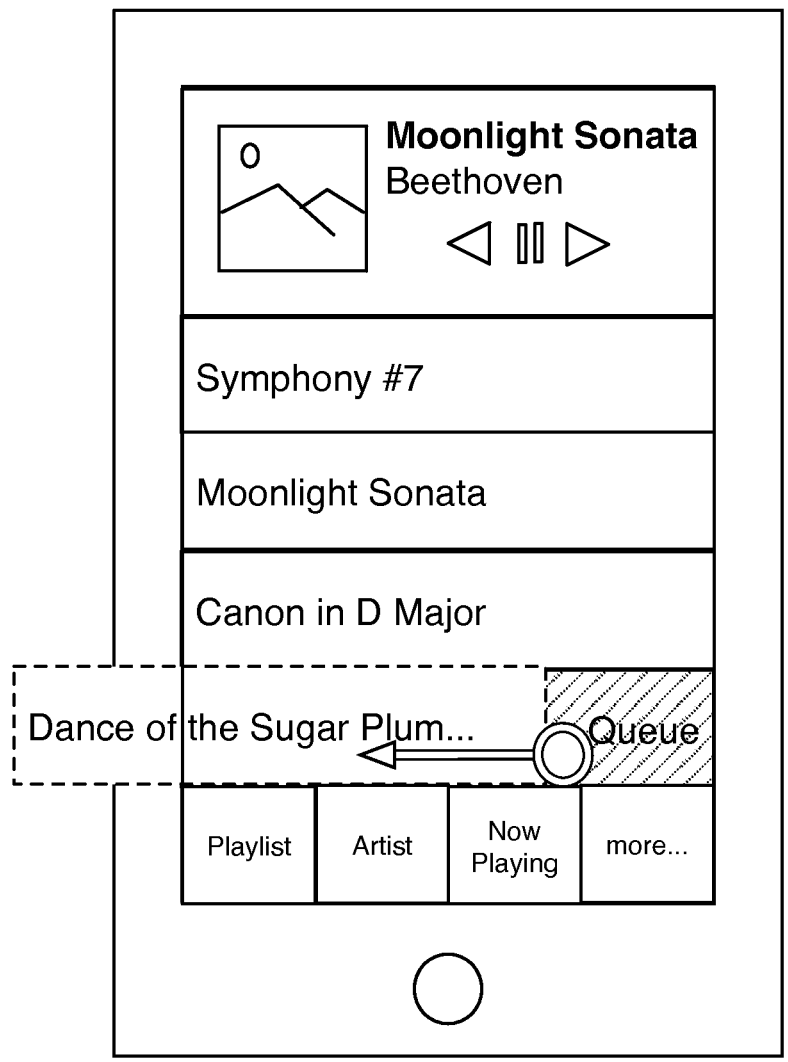
FIG. 15 is a schematic representation of an implementation for media content.

As shown in FIG. 15, an implementation of method S300 can be applied for media related contexts. The gesture-based input can be used with media files to apply media related actions. Media files can include audio files, videos files, images, multimedia files, and/or any suitable type of media file. The method may be applied to the media playing, media organization, media editing, media browsing, media marketplace, and/or any suitable media application. In one variation, the method may be applied to a media player. Songs and videos may be displayed in a list like format. Gesture input could be applied to each of the media items. In the case of a music player application, the set of actions mapped to gesture-states can include actions such as add to playlist, queue song, share song, purchase song, favorite or rate the song, send audio to a particular device (e.g., send to TV or over Bluetooth speakers), and/or any suitable song related action. The actions can similarly be applied to a video player or a photo organization application.

Figure 16:
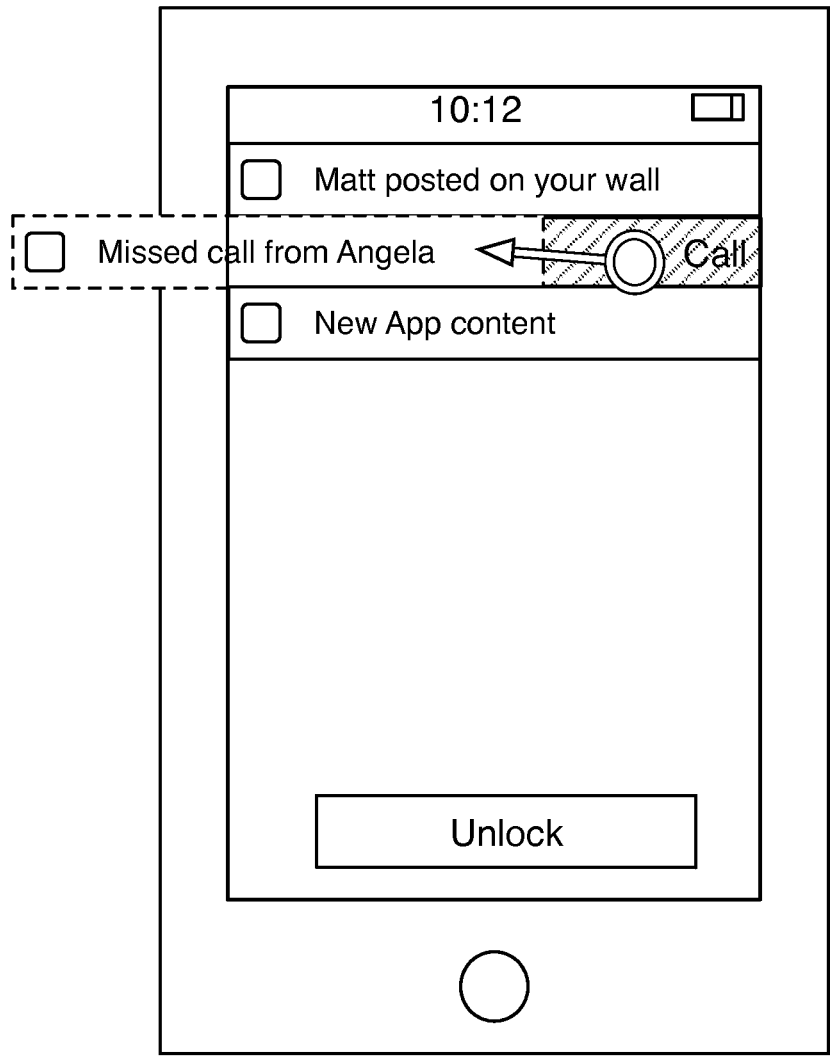
FIG. 16 is a schematic representation of an implementation for notification content.

As shown in FIG. 16, an implementation of method S300 can be applied a notification center. The notification center is preferably part of an operating system of a device such as a mobile device, a desktop computer, a TV connected device, a wearable computing device, or any suitable computing device. The notification center may alternatively be part of an application. Preferably, notifications appear within a list. The notifications can come from several various sources and vary in type. Notifications can include application-specific alerts, communication alerts, error notifications, reminders, event updates, synchronization alerts, collaboration alerts, and/or any suitable type of notification. The gesture-state to action mapping is preferably specific to the type of notification, which functions to enable a user to respond to a notification in various manners. Furthermore, the user may respond to a notification and perform application-specific actions without opening that application. In one variation, developers of applications can configure various actions for the set of gesture-states detected in a notification item. Additionally or alternatively, some notifications may come with a predefined gesture-state to action mapping. For example, an event notification may appear on the user's mobile phone. As opposed to simply selecting or swiping the notification to open up their corresponding event item, the user may use various gestures to take different actions such as setting a second reminder for the event, inviting another user to the event, requesting directions to the event location, marking the event as complete, rescheduling the event, and/or any suitable configured event action.

Figure 17:
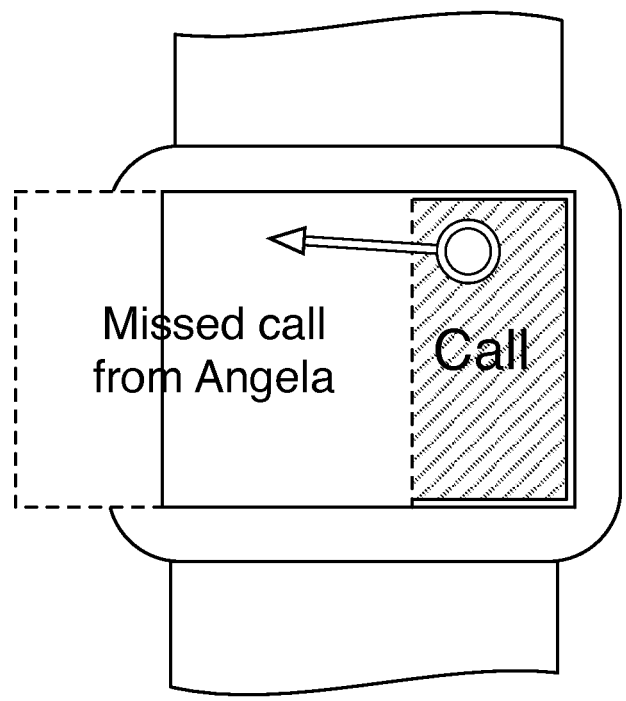
FIG. 17 is a schematic representation of an implementation for a computing device with a small display area.

As shown in FIG. 17, the implementation of method S300 can be applied to computing devices with limited display area in a manner substantially similar to that of the navigation implementation. Devices with limited display area can include wearable computing devices such as a watch computing device, glasses with a heads-up display, a small MP3 player, a camera, or any suitable device. With unlimited display area applications, media, messages, information, and any suitable form of content may require utilizing a majority of the screen real estate. Method S300 can be used to provide an intuitive interaction model without requiring user interface elements taking screen real estate away from the content. For example, glasses based computing devices may include header display and a touch sensitive input sensor on at least one of the arms of the glasses. The touch sensitive input may afford gesture input on two axis, a vertical axis and a horizontal axis. The first axis (e.g., the vertical axis) may be used to scroll through different items. The second axis (e.g., horizontal axis) may be used to invoke actions on the current modally displayed content. Similar to the notification implementation, the method may include providing a developer interface to customize gesture-state to action mapping.

An alternative embodiment preferably implements the above methods in a computer-readable medium storing computer-readable instructions. The instructions are preferably executed by computer-executable components preferably integrated with a gesture detection engine. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

As a person skilled in the art will recognize from the previous detailed description and from the figures and claims, modifications and changes can be made to the preferred embodiments of the invention without departing from the scope of this invention defined in the following claims.

What is claimed is:

1. A method comprising:
    detecting initiation of a gesture input at a digital content item rendered in a user interface; during a duration of the gesture input:
        tracking the gesture input from a start location on a graphical user interface to a current location in a first direction on the graphical user interface, wherein the start location is within a representation of the digital content item on the graphical user interface;
        determining, based on the tracked gesture input, a magnitude of a current displacement of the gesture input from the start location to the current location, where the magnitude corresponds to a distance between the start location and the current location;
        determining, based on the magnitude of the current displacement of the gesture input, a current gesture state from a set of gesture states, where the current gesture state corresponds to a first gesture state when the magnitude is less than a threshold distance and where the current gesture state corresponds to a second gesture state when the magnitude is greater than or equal to the threshold distance;
        identifying an action mapped to the current gesture state; and
        rendering a graphic of the identified action;
    upon detecting a termination of the gesture input, selecting the identified action as a selected action; and
    applying the selected action to the digital content item.

2. The method of claim 1, wherein determining the current gesture state is based at least in part on one or more of:
    a velocity along the first direction of the gesture input; or
    a duration of the gesture input.

3. The method of claim 1, wherein determining the current gesture state is based at least in part on a direction of a current displacement along a first axis of the gesture input from an initial input position and at least in part on a magnitude along the first axis of the current displacement, and wherein determining the current gesture state includes:
    selecting a first gesture state as the current gesture state in the event that the direction of the current displacement along the first axis is a first direction and the magnitude along the first axis of the current displacement becomes greater than the first threshold distance; or
    selecting a second gesture state as the current gesture state in the event that the direction of the current displacement along the first axis is the first direction and the magnitude along the first axis of the current displacement becomes greater than the second threshold distance, the second threshold distance being greater than the first threshold distance.

4. The method of claim 3 wherein determining the current gesture state further includes:
    selecting a third gesture state as the current gesture state in the event that the direction of the current displacement along the first axis is a second direction opposite the first direction and the magnitude along the first axis of the current displacement becomes greater than the first threshold value.

5. The method of claim 4 wherein determining the current gesture state further includes:
    selecting a fourth gesture state as the current gesture state in the event that the direction of the current displacement along the first axis is the second direction and the magnitude along the first axis of the current displacement becomes greater than the second threshold value.

6. The method of claim 3, wherein the first threshold value corresponds to a first magnitude that is less than three times a width of an input tool providing the gesture input and the second threshold value corresponds to a second magnitude that is greater than three times the width of the input tool.

7. The method of claim 1, wherein determining the current gesture state is based at least in part on a direction of a current displacement along a first axis of the gesture input from an initial input position, the first axis being in a different orientation to an axis of scrolling of a displayed set of content items that includes the digital content item.

8. The method of claim 1, wherein:
    determining the current gesture state is based at least in part on a direction of a current displacement along a first axis of the gesture input from an initial input position; and
    rendering the graphic of the action mapped to the current gesture state further comprises animating a translation of the digital content item along the first axis and revealing the graphic of the action in a screen area exposed by the translation.

9. The method of claim 1, wherein determining the current gesture state includes transitioning from a first gesture state to a second gesture state in the event that the tracked gesture input indicates a screen-edge touch transition.

10. The method of claim 1, further comprising if the selected action removes the digital content item from a current navigational view, animating a transition of the digital content item out of the navigational view.

11. The method of claim 1, wherein applying the selected action to the digital content item includes:
    displaying a secondary view with a plurality of action options; and
    receiving an option input selecting one of the plurality of action options the secondary view,
    wherein the selected action is applied according the received option input.

12. The method of claim 1, wherein determining the current gesture state is based at least in part on a number of touch input points included in the tracked gesture input.

13. The method of claim 1, wherein identifying the action mapped to the current gesture state is based at least in part on one or more of: a content type of the digital content item; or an application navigational context.

14. The method of claim 1, wherein the digital content item includes one or more of:
    a media file;
    an email message; or
    notification displayed within a notification view of an application.

15. The method of claim 1, wherein the gesture input is detected and tracked using an interface selected from a group consisting of a touch-sensitive user interface and a visual gestural input interface.

16. The method of claim 1, wherein the digital content item is rendered in a content item grouping presented in the user interface;
    wherein identifying an action mapped to the current gesture state includes determining which one of a plurality of hidden content item groupings to move the digital content item into based on the magnitude of the gesture input; and wherein applying the selected action to the digital content item includes moving the digital content item into the determined hidden content item grouping.

17. A method for controlling a computing device with a display, the method comprising:

detecting initiation of a gesture input at a digital content item rendered in a user interface on the display;

tracking the gesture input at the digital content item for a magnitude of a current displacement of the gesture input from a start location to a current location in a first direction, wherein the start location is within a representation of the digital content item on the graphical user interface, and wherein the magnitude corresponds to a distance between the start location and the current location; and rendering a graphic of an action mapped to a gesture state, where the gesture state corresponds to a first gesture state when the magnitude is less than a threshold distance and where the current gesture state corresponds to a second gesture state when the magnitude is greater than or equal to the threshold distance, and wherein the rendering comprises animating a translation of the digital content item along a first axis, the translation revealing the graphic of the action in a screen area exposed by the translation.

18. A method comprising:

detecting initiation of a gesture input at a digital content item rendered in a user interface; during a duration of the gesture input:

tracking the gesture input from a start location on a graphical user interface to a current location on the graphical user interface, wherein the start location is within a representation of the digital content item on the graphical user interface;

determining, based on the tracked gesture input, a distance of a current displacement of the gesture input from the start location to the current location;

determining, based on the distance of the current displacement of the gesture input, a current gesture state from a set of gesture states, wherein determining the current gesture state is based at least in part on a direction of a current displacement along a first axis of the gesture input from an initial input position and at least in part on a magnitude along the first axis of the current displacement, and wherein determining the current gesture state includes:

selecting a first gesture state as the current gesture state in the event that the direction of the current displacement along the first axis is a first direction and the magnitude along the first axis of the current displacement becomes greater than a first threshold value;

selecting a second gesture state as the current gesture state in the event that the direction of the current displacement along the first axis is the first direction and the magnitude along the first axis of the current displacement becomes greater than a second threshold value, the second threshold value being greater than the first threshold value;

identifying an action mapped to the first or second gesture state; and rendering a graphic of the identified action;

upon detecting a termination of the gesture input, selecting the identified action as a selected action; and applying the selected action to the digital content item.

* * * * *